United States Patent
Fukuda

(10) Patent No.: US 9,549,034 B2
(45) Date of Patent: Jan. 17, 2017

(54) INFORMATION PROCESSING SYSTEM

(71) Applicant: NEC Corporation, Tokyo (JP)

(72) Inventor: Misao Fukuda, Tokyo (JP)

(73) Assignee: NEC CORPORATION, Tokyo (JP)

( * ) Notice: Subject to any disclaimer, the term of this patent is extended or adjusted under 35 U.S.C. 154(b) by 213 days.

(21) Appl. No.: 14/389,521

(22) PCT Filed: Mar. 19, 2013

(86) PCT No.: PCT/JP2013/001852
§ 371 (c)(1),
(2) Date: Sep. 30, 2014

(87) PCT Pub. No.: WO2013/145634
PCT Pub. Date: Oct. 3, 2013

(65) Prior Publication Data
US 2015/0067015 A1  Mar. 5, 2015

(30) Foreign Application Priority Data

Mar. 30, 2012 (JP) .................. 2012-079717
Aug. 21, 2012 (JP) .................. 2012-182633

(51) Int. Cl.
H04L 29/08 (2006.01)
H04M 7/00 (2006.01)
(Continued)

(52) U.S. Cl.
CPC .......... *H04L 67/28* (2013.01); *H04L 41/0668* (2013.01); *H04L 67/10* (2013.01); *H04L 69/40* (2013.01); *H04M 7/006* (2013.01); *H04M 7/127* (2013.01)

(58) Field of Classification Search
CPC .... H04W 48/06; H04W 48/16; H04W 84/042; G06F 1/263; H02J 7/02
See application file for complete search history.

(56) References Cited

U.S. PATENT DOCUMENTS

2006/0004909 A1  1/2006  Takuwa et al.
2006/0143255 A1  6/2006  Shinohe et al.
(Continued)

FOREIGN PATENT DOCUMENTS

CN   1821967    8/2006
CN   101000572  7/2007
(Continued)

OTHER PUBLICATIONS

Chinese Office Action dated Mar. 25, 2016 in corresponding Chinese Patent Application No. 201380028369.7 with English translation of Chinese Office Action.
(Continued)

*Primary Examiner* — Peling Shaw
(74) *Attorney, Agent, or Firm* — Young & Thompson

(57) ABSTRACT

An information processing system including an information processing unit that performs communication processing among a plurality of user terminals connected via an IP (Internet Protocol) network. The information processing unit includes control elements for acquiring an operating state of the information processing unit, as well as, instructs another information processing unit to perform the communication processing among the plurality of user terminals, according to the acquired operating state.

11 Claims, 20 Drawing Sheets

(51) Int. Cl.
*H04L 12/24* (2006.01)
*H04L 29/14* (2006.01)
*H04M 7/12* (2006.01)

(56) References Cited

U.S. PATENT DOCUMENTS

| | | |
|---|---|---|
| 2006/0190484 A1 | 8/2006 | Cromer et al. |
| 2008/0062997 A1* | 3/2008 | Nix .................. H04L 29/12066 370/395.2 |
| 2010/0153558 A1* | 6/2010 | Kommula ......... H04L 29/12066 709/226 |
| 2010/0184432 A1 | 7/2010 | Yano et al. |
| 2011/0028130 A1* | 2/2011 | Swaminathan ... H04M 3/42195 455/414.1 |
| 2011/0173339 A1* | 7/2011 | Zhang .................... H04L 12/66 709/229 |

FOREIGN PATENT DOCUMENTS

| | | |
|---|---|---|
| JP | 2003-281007 | 10/2003 |
| JP | 2005-057461 | 3/2005 |
| JP | 2005-339528 | 12/2005 |
| JP | 2006-228220 | 8/2006 |
| JP | 2006-287697 | 10/2006 |
| JP | 2008-135056 | 6/2008 |
| JP | 2008-271501 | 11/2008 |
| JP | 2010-171714 | 8/2010 |
| JP | 2010-287256 | 12/2010 |
| JP | 2011-010187 | 1/2011 |

OTHER PUBLICATIONS

International Search Report PCT/JP2013/001852 dated Apr. 16, 2013.

* cited by examiner

# INFORMATION PROCESSING SYSTEM

TECHNICAL FIELD

The present invention relates to an information processing system configured to provide services to user terminals connected via an Internet Protocol (IP) network.

BACKGROUND ART

There has been known an information processing system that comprises an information processing unit that relays communications between a user terminal and another user terminal that the user terminal is desired to be connected, which are connected via an Internet Protocol (IP) network. For example, the information processing system of PTL 1 is described as comprising a Session Initiation Protocol (SIP) server as the information processing unit. Further, there has been known a technique that comprises a server for implementing Unified Communications (UC) as the information processing unit.

CITATION LIST

Patent Literature

[PTL 1] Japanese Unexamined Patent Application Publication No. 2006-287697

SUMMARY OF THE INVENTION

Technical Problem

Meanwhile, the above-described information processing system has a risk that a user terminal cannot communicate certain information with another user terminal when an excessive load is imposed on the information processing unit (e.g., when many user terminals sent connection requests to the SIP server), or when a fault occurs in the information processing unit.

Thus, the objective of the present invention is to provide an information processing system that can solve the above-described subject, that is, a problem that, in some cases, a user terminal may not be able to communicate predetermined information with another user terminal.

Solution to Problem

To achieve such an objective, the information processing system as an aspect of the present invention includes: an information processing unit that performs communication processing among a plurality of user terminals connected via an IP (Internet Protocol) network. The information processing unit includes control means for acquiring an operating state of the information processing unit, and instructs another information processing unit to perform communication processing among the plurality of user terminals according to the acquired operating state.

Further, the information processing system as another aspect of the present invention is an information processing system that includes: an information processing unit that performs communication processing among a plurality of user terminals connected via an IP (Internet Protocol) network. The information processing unit includes: service providing means for providing a preset service to the plurality of user terminals; and control means for acquiring an operating state of the service providing means, and generates a new service providing means according to the acquired operating state Further, an information processing method as another aspect of the present invention is an information processing method applied to an information processing system that includes an information processing unit performing communication processing among a plurality of user terminals connected via an IP (Internet Protocol) network. The method includes: acquiring an operating state of the information processing unit, and instructing another information processing unit to perform the communication processing among the plurality of user terminals, according to the acquired operating state.

Further, a program as another aspect of the present invention is a program for controlling an information processing system that includes an information processing unit performing communication processing among a plurality of user terminals connected via an IP (Internet Protocol) network. The program causes the information processing unit to implement control means that acquires an operating state of the information processing unit, and instructs another information processing unit to perform communication processing among the plurality of user terminals, according to the acquired operating state.

Further, an information processing device as another aspect of the present invention is an information processing device that performs communication processing among a plurality of user terminals connected via an IP (Internet Protocol) network. The information processing device includes: control means that acquires an operating state of the information processing device, and instructs another information processing device to perform the communication processing among the plurality of user terminals, according to the acquired operating state.

Further, an information processing method as another aspect of the present invention is an information processing method applied to an information processing system that includes an information processing unit performing communication processing among a plurality of user terminals connected via an IP (Internet Protocol) network. The information processing unit includes service providing means for providing a preset service to the plurality of user terminals, and the information processing method including acquiring an operating state of the service providing means, and generates a new service providing means according to the acquired operating state.

Further, a program as another aspect of the present invention is a program for controlling an information processing system that includes an information processing unit performing communication processing among a plurality of user terminals connected via an IP (Internet Protocol) network. The program causes the information processing unit to implement: service providing means that provides a preset service to the plurality of user terminals; and control means that acquires an operating state of the service providing means and generates a new service providing means according to the acquired operating state.

Further, an information processing device as another aspect of the present invention is an information processing device that performs communication processing among a plurality of user terminals connected via an IP (Internet Protocol) network, including: service providing means for providing a preset service to a plurality of user terminals; and control means for acquiring an operating state of the service providing means, and generates a new service providing means according to the acquired operating state.

Advantageous Effect of Invention

By configuring as above, the present invention can ensure secure communication processing among a plurality of user terminals.

DESCRIPTION OF THE EMBODIMENTS

The following will explain each embodiment of the information processing system according to the present invention with reference to FIGS. 1 to 20.

First Exemplary Embodiment

Configuration

Figure 1:
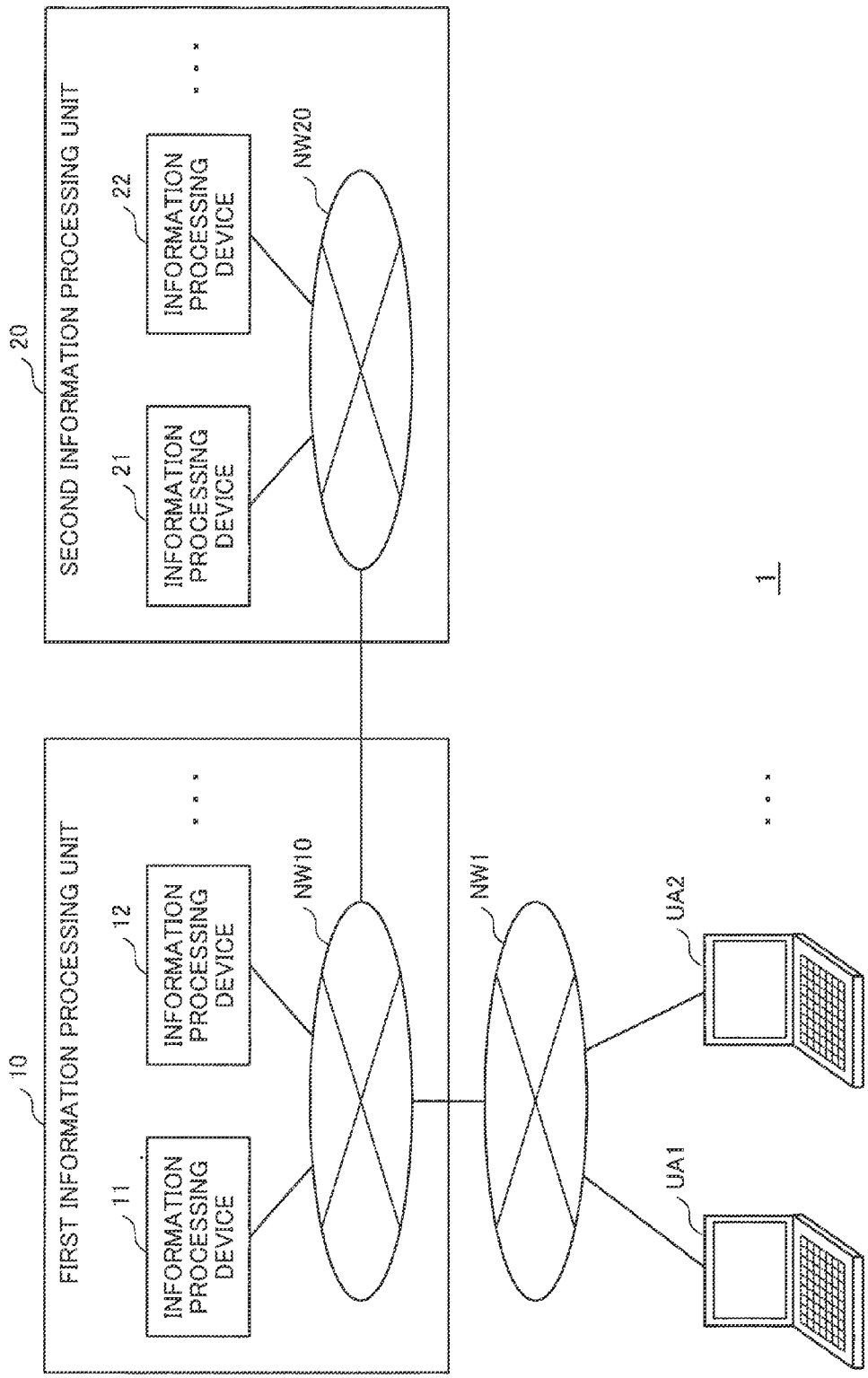
FIG. 1 is a diagram depicting a configuration of an information processing system according to a first embodiment of the present invention.

As depicted in FIG. 1, an information processing system 1 according to the first embodiment contains: a plurality of information processing units that include a first information processing unit 10 and a second information processing unit 20. Note that the information processing system 1 may contain three or more information processing units. The first information processing unit 10 is, for example, located in a first country (e.g., Japan). The second information processing unit 20 is, for example, located in a second country that is different from the first country (e.g., America). It will be appreciated that, without limitation to above, the information processing units 10, 20 may be located in the same country (e.g., Japan).

The first information processing unit 10 contains a plurality of information processing devices 11, 12, . . . . The plurality of information processing devices 11, 12, . . . are communicably connected via a first in-unit communication network NW 10. In the example of the first embodiment, each of the plurality of information processing devices 11, 12, . . . (each of the information processing devices 11, 12, . . . ) is a blade server. While the first information processing unit 10 is set as containing a plurality of information processing devices 11, 12, . . . , the first information processing unit 10 may be configured by a single information processing device (e.g., an information processing device 11). In other words, a single information processing device may have a configuration for implementing the functional sections of the first information processing unit 10 as will be described later herein. Likewise, other information processing units, as will be described below, may also be each configured by a single information processing device. A plurality of user terminals UA1, UA2, . . . are connected to the first in-unit communication network NW10 via a user-side communication network NW1.

Likewise, the second information processing unit 20 contains a plurality of information processing devices 21, 22, . . . . The plurality of information processing devices 21, 22, . . . are communicably connected via a second in-unit communication network NW20. Further, each of the plurality of information processing devices 21, 22, . . . (each information processing device 21, 22, . . . ) is a blade server. Note that, while the following will describe the information processing devices 11, 12, . . . , the information processing devices 21, 22, . . . also have the same configurations.

Each information processing device 11, 12, . . . is configured so as to be able to construct a plurality of virtual machines (virtual servers). In particular, each information processing device 11, 12, . . . executes a program of an Operating System (OS) as a main program (main OS).

Further, each information processing device 11, 12, . . . executes a virtual machine program as a program for operating a virtual machine on the main OS. In addition, each information processing device 11, 12, . . . executes at least one (e.g., a plurality of) sub-OS (guest OS) on the virtual machine program.

In addition, each information processing device 11, 12, . . . executes at least one application program on each guest OS. The guest OS executed by each information processing device 11, 12, . . . configures a virtual machine. Each virtual machine implements one of the functional sections as will be described later herein.

Each of the plurality of user terminals UA1, UA2, . . . (each user terminal UA1, UA2, . . . ) is, for example, a personal computer or a smartphone. Note that each user terminal UA1, UA2, . . . may be a mobile telephone terminal, a PHS (Personal Handy-phone System), a PDA (Personal Data Assistance, Personal Digital Assistant), a car navigation terminal, or a game terminal.

The plurality of user terminals UA1, UA2, . . . are communicably connected via the user-side communication network NW1. Note that the user-side communication network NW1 and the in-unit communication network NW10 are connected to each other. The user-side communication network NW1 and the in-unit communication networks NW10, NW20 are configured by communication networks, such as IP networks.

Each user terminal UA1, UA2, . . . contains a Central Processing Unit (CPU), storage devices (a memory and a hard disk drive device (HDD)), an input device (a plurality of key buttons in the example of the first embodiment), and an output device (a display in the example of the first embodiment) that are not depicted in the drawings. Each user terminal UA1, UA2, . . . is configured so as to implement functions as will be described later herein by executing a program stored in the storage device with the CPU.

Figure 2:
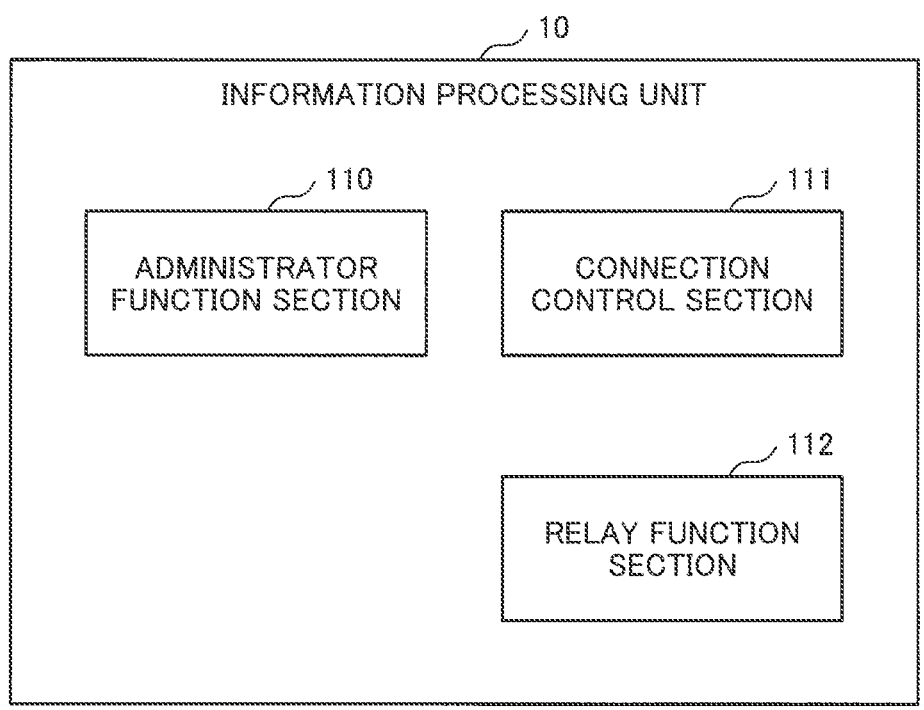
FIG. 2 is a block diagram depicting functions of an information processing unit according to the first embodiment of the present invention.
Figure 3:
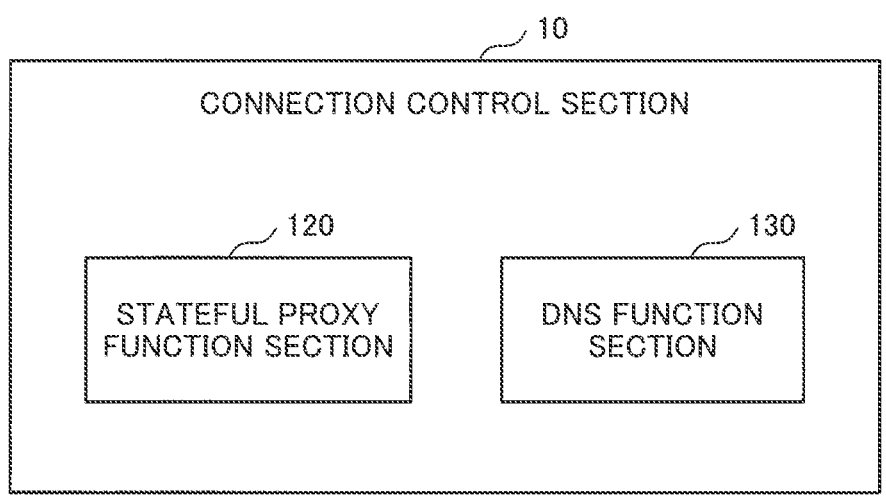
FIG. 3 is a block diagram depicting functions of a connection control section according to the first embodiment of the present invention.

Next, the configuration of the information processing unit 10 will be described with reference to FIGS. 2 and 3. As depicted in FIG. 2, the functions of the information processing unit 10 (the first information processing unit) include an administrator function section 110 (a control section), a connection control section 111, and a relay function section 112. Further, as depicted in FIG. 3, the connection control section 111 includes a stateful proxy function section 120 and a DNS (Domain Name (Naming) System (Server)) function section 130. The connection control section 111 is, for example, an SIP (Session Initiation Protocol) server, which controls a connection among a plurality of user terminals. The relay-function section 112 is, for example, a server for implementing UC, which relays communications among a plurality of user terminals. The details of the connection control section 111 and the relay function section 112 will be described later herein. Note that the information processing unit 10 may contain at least one of the connection control section 111 and the relay function section 112.

Note that the information processing system 1 may contain an additional administrator function section outside the information processing units (at a location apart from the information processing units), for example, as a Business Continuity Plan (BCP) measure. As such, utilizing such an external administrator function section, the function of the administrator function section can be quickly restored when an unexpected event occurs, such as a disaster or an accident. Further, the information processing system 1 may contain an administrator unit that collectively performs administrator function sections of the plurality of information processing units outside the information processing units. Further, in the same way as the administrator function section 110, the information processing system 1 can dispersively distribute additional stateful proxy function section 120 and DNS function section 130 outside the information processing units. Furthermore, the information processing system 1 can install additional functional sections of the information processing unit 10 (administrator function section 110, a stateful proxy function section 120, and a DNS function section 130) on, for example, a satellite outside the information processing units.

The administrator function section 110 manages the connection control section 111 (specifically, the stateful proxy function section 120 and the DNS function section 130) and the relay function section 112. Further, the administrator function section 110 acquires an IP address allocated to each constructed virtual machine; information that indicates a load of each virtual machine; an IP address allocated to a virtual machine that configures the relay function section 112; an IP address allocated to a virtual machine that configures the stateful proxy function section 120; identification information (e.g., ID (identification) and a telephone number) and an IP address for identifying each of the plurality of user terminals UA1, UA2, . . . among which a session is established; and the like, and retains the acquired information.

Further, the administrator function section 110 acquires the operating state of the information processing unit 10 (the connection control section 111 and the relay function section 112), and, according to the acquired operating state, instructs another information processing unit (for example, the second information processing unit 20) to perform the communication processing among the user terminals UA1, UA2, . . . . That is, the administrator function section 110 switches the information processing unit for performing the communication processing. The administrator function section 110 is configured, when there are a plurality of information processing units, to instruct the information processing unit with the smallest load to perform the communication processing. The following will specifically describe the details.

For example, the administrator function section 110 acquires load information that indicates the load of the connection control section 111 as the operating state. For example, the load is the activity ratios of hardware resources such as the CPU and the memory. When the load indicated by the acquired load information is larger than a predefined first load threshold, the administrator function section 110 instructs another information processing unit (or, the connection control section 111 included therein) to control connections among the user terminals UA1, UA2, . . . . As such, occurrence of congestion can be securely avoided.

Further, the administrator function section 110 detects occurrence of a fault in the connection control section 111 as the operating state (acquires whether or not a fault has occurred). When occurrence of a fault is detected in the connection control section 111, the administrator function section 110 instructs another information processing unit to control connections among the plurality of user terminals. As such, the connections among the user terminals UA1, UA2, . . . can be secured.

Likewise, the administrator function section 110 acquires load information that indicates the load of the relay function section 112 as the operating state. When the load indicated by the acquired load information is larger than a predefined second load threshold, the administrator function section 110 instructs another information processing unit (or, the relay function section 112 included therein) to relay communications among the user terminals UA1, UA2, . . . . As such, occurrence of congestion can be securely avoided.

Further, the administrator function section 110 detects occurrence of a fault in the relay function section 112 as the operating state. When occurrence of a fault is detected in the relay function section 112, the administrator function section 110 instructs another information processing unit to control communications among the plurality of user terminals. As such, communications among the user terminals UA1, UA2, . . . can be secured.

Further, the administrator function section 110 communicates with the administrator function section of another information processing unit (e.g., the second information processing unit 20) to transmit and receive the operating state. The operating state that the administrator function section 110 transmits and receives includes at least one of: a load of the information processing unit; a load threshold; and occurrence of a fault. Then, the administrator function section 110 stores the acquired operating state in the storage device (or in a database). As such, for example, when congestion occurs due to the increased load of the information processing unit 10, another information processing unit that can avoid congestion can be immediately selected to quickly avoid the occurrence of congestion. Further, for example, when a fault occurs in the information processing unit 10, another information processing unit without a fault can be immediately selected to quickly and securely relay communications among the user terminals UA1, UA2, . . . .

Note that the administrator function section 110 may be constantly connected with the administrator function section of another information processing unit, or may be connected with the administrator function section of another information processing unit at every preset time interval to transmit and receive the operating state. Further, for example, when selecting another information processing unit, the administrator function section 110 may select another information processing unit with the smallest load, or select another information processing unit with the shortest communication distance among other information processing units that can avoid congestion.

Further, each user terminal UA1, UA2, . . . transmits a connection request notification to the information processing unit 10 based on the information input by a user. Then, the administrator function section 110 receives the connection request notification transmitted from the user terminal UA1, UA2, . . . . The user terminal UA1, UA2, . . . as the transmission source (i.e., a communication source) of the connection request notification is also referred to as a communication source user terminal. Further, the connection request notification includes identification information for identifying the communication destination (e.g., a user terminal (a communication destination user terminal) or a relay function section 112).

The administrator function section 110 transmits (outputs) the identification information included in the received connection request notification to the connection control section 111 (the stateful proxy function section 120). The stateful proxy function section 120 receives the identification information transmitted from the administrator function section 110. The stateful proxy function section 120 transmits (outputs) the received identification information to the DNS function section 130.

The stateful proxy function section 120 receives the IP address transmitted from the DNS function section 130 as the communication destination IP address. According to the SIP, the stateful proxy function section 120 establishes a session between the received communication destination IP address and the communication source IP address that is an IP address allocated to the communication source user terminal. Further, the stateful proxy function section 120 transmits the communication destination IP address to the communication source user terminal. Note that, when a communication source user terminal and a communication destination user terminal connect to each other via the relay function section 112 (when the communication destination IP address is the IP address of the relay function section 112), the processing in which the stateful proxy function section 120 establishes a session can be skipped.

In a case in which a session is established by the stateful proxy function section 120 and the user terminals are in communication with each other, if a connection request notification is transmitted from another user terminal to the user terminal that is in communication (e.g., the user terminal UA1), the administrator function section 110 can notify the other user terminal that the user terminal is in communication. For example, when a session is established between the user terminal UA1 and the user terminal UA2, and the user terminals UA1 and UA2 are in a call (in communication with each other), if another user terminal makes a phone call (transmitted a connection request notification) to the user terminal UA1, the administrator function section 110 transmits a busy-back tone that indicates the line is busy to the other user terminal. The information that indicates the effect that the user terminal is already in communication (e.g., busy-back tone) is stored in advance in the storage device.

The DNS function section 130 stores identification information in association with an IP address allocated to the identification information. The DNS function section 130 receives the identification information transmitted from the stateful proxy function section 120. The DNS function section 130 transmits (outputs) the IP address stored in association with the received identification information to the stateful proxy function section 120 that transmitted the identification information.

Each user terminal UA1, UA2, . . . transmits a connection request notification to the information processing unit 10 based on the information input by a user. Further, each user terminal UA1, UA2, . . . receives the communication destination IP address from the information processing unit 10. Each user terminal UA1, UA2, . . . communicates with another user terminal UA1, UA2, . . . to which is allocated the received communication destination IP address via a session established by the information processing unit 10. As such, the user of the user terminal UA1, UA2, . . . can transmit and receive predetermined information.

Further, when receiving the communication destination IP address of a relay function section 112 from the information processing unit 10, the user terminal UA1, UA2, . . . transmits a server connection request that includes the received communication destination IP address to the information processing unit 10 (administrator function section 110). The administrator function section 110 transmits (outputs) the communication destination IP address included in the server connection request received from the user terminal UA1, UA2, . . . and the IP address of the communication source user terminal to the relay function section 112.

The relay function section 112 is, for example, a server for implementing UC, which contains a variety of transmission means and communication means that integrally achieve efficient communications. The communication means may be, for example, a WEB conference, a television (TV) conference, a multipoint conference, chat, an Interactive Voice Response (IVR), and a contact center.

The relay function section 112 receives the IP addresses transmitted from the administrator function section 110. Then, the relay function section 112 connects with the user terminals UA1, UA2, . . . based on the received IP addresses (e.g., the communication source IP address and the communication destination IP address). Then, the relay function section 112 provides the communication means selected by the user terminal UA1, UA2, . . . to the user terminal UA1, UA2, . . . . As such, the users of the user terminals UA1, UA2, . . . can communicate predetermined information.

(Operation)

Figure 4:
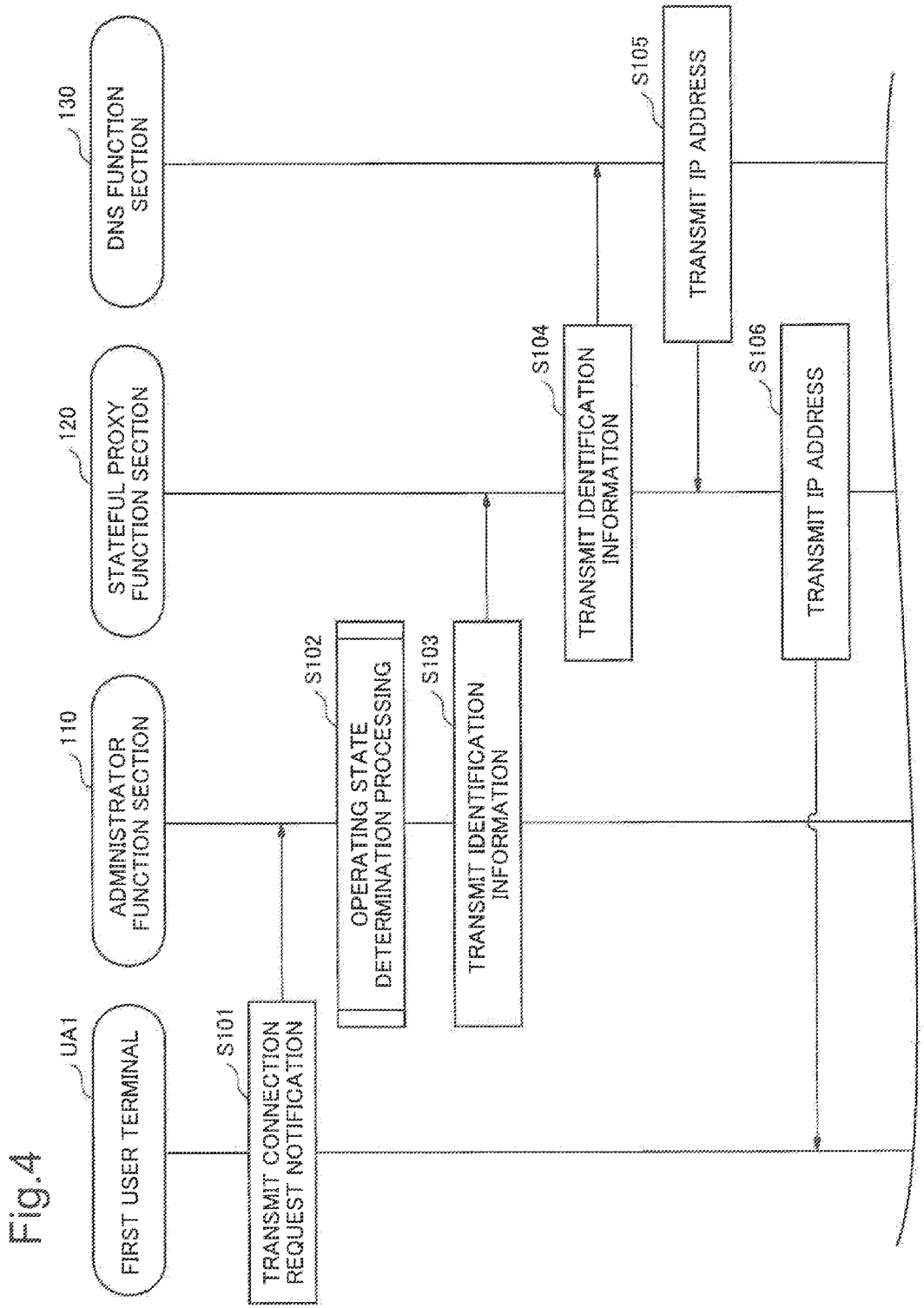
FIG. 4 is a sequence diagram depicting operation of the information processing system according to the first embodiment of the present invention.

Next, the operation of the above-described information processing system 1 will be described. First, as depicted in FIG. 4, the first user terminal UA1 transmits a connection request notification that includes the identification information for identifying the second user terminal UA2 (or, the relay function section 112) to the administrator function section 110 (step S101).

As such, the administrator function section 110 receives the connection request notification. Then, the administrator function section 110 performs the operating state determination processing for the connection control section 111 (step S102). The operating state determination processing will be described with reference to FIG. 5.

Figure 5:
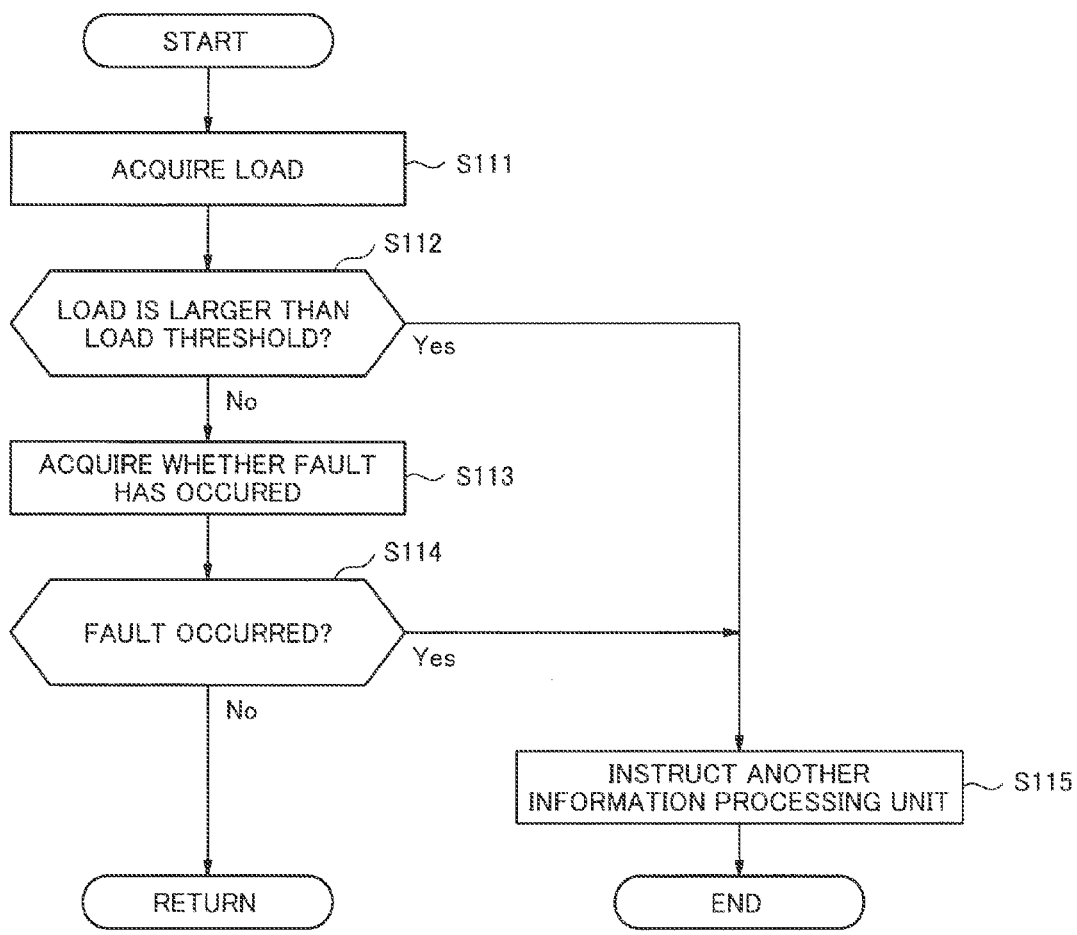
FIG. 5 is a flowchart depicting processing that an administrator function section performs according to the first embodiment of the present invention.

As depicted in FIG. 5, first, the administrator function section 110 acquires a load of the connection control section 111 (step S111). Subsequently, whether the acquired load is larger than the preset load threshold (the connection control load threshold) is determined (step S112).

When the load is determined as not larger than the load threshold (step S112: No), the administrator function section 110 acquires whether a fault has occurred in the connection control section 111 (detects a fault) (step S113). When occurrence of a fault is determined (step S114: Yes), and when the load is determined as larger than the load threshold (step S112: Yes), the administrator function section 110 instructs another information processing unit to control connections among the plurality of user terminals (step S115). The operating state determination processing terminates after the processing of step S115, and the processing of FIG. 4 is performed again by another information processing unit (e.g., the second information processing unit 20).

That is, the information processing unit (e.g., the second information processing unit 20) receives a connection request notification from another information processing unit (e.g., the first information processing unit 10), instead of receiving a connection request notification from a user terminal (step S101), then, performs the processing of step S102 and after. Note that, when there are a plurality of information processing units, the administrator function section 110 transmits a connection request notification, for example, to the information processing unit with the smallest load. Thus, the another information processing unit that received the connection request notification from the information processing unit 10 can skip the operating state determination processing.

On the other hand, when non-occurrence of a fault is determined (step S114: No), the processing proceeds to step S103 of FIG. 4. That is, as the result of the operating state determination processing of step S102, if the load of the connection control section 111 is the preset load threshold or lower, and no fault has occurred in the connection control section 111, the administrator function section 110 transmits the identification information included in the connection request notification to the stateful proxy function section 120 (step S103).

As such, the stateful proxy function section 120 receives the identification information. Then, the stateful proxy function section 120 transmits the identification information to the DNS function section 130 (step S104).

As such, the DNS function section 130 receives the identification information. Then, the DNS function section 130 acquires the IP address stored in association with the identification information as the communication destination IP address. Next, the DNS function section 130 transmits the communication destination IP address to the stateful proxy function section 120 (step S105). Note that, when receiving the connection request notification from another information processing unit, the DNS function section 130 may not have an IP address in association with the identification information. When the DNS function section 130 does not have the IP address in association with the identification information, the administrator function section 110 accesses another DNS function section existing outside the information processing unit 10 or a DNS server to acquire the IP address in association with the identification information.

As such, the stateful proxy function section 120 receives the communication destination IP address. Then, the stateful proxy function section 120 transmits the communication destination IP address to the first user terminal UA1 (step S106). As such, the user terminal UA1 receives the communication destination IP address. Note that, when a connection request notification from another information processing unit is received, the stateful proxy function section 120 transmits the communication destination IP address to the another information processing unit from which the connection request notification is received in the processing of step S106. Then, the another information processing unit that received the communication destination IP address transmits (transfers) the communication destination IP address to the user terminal.

Figure 6:
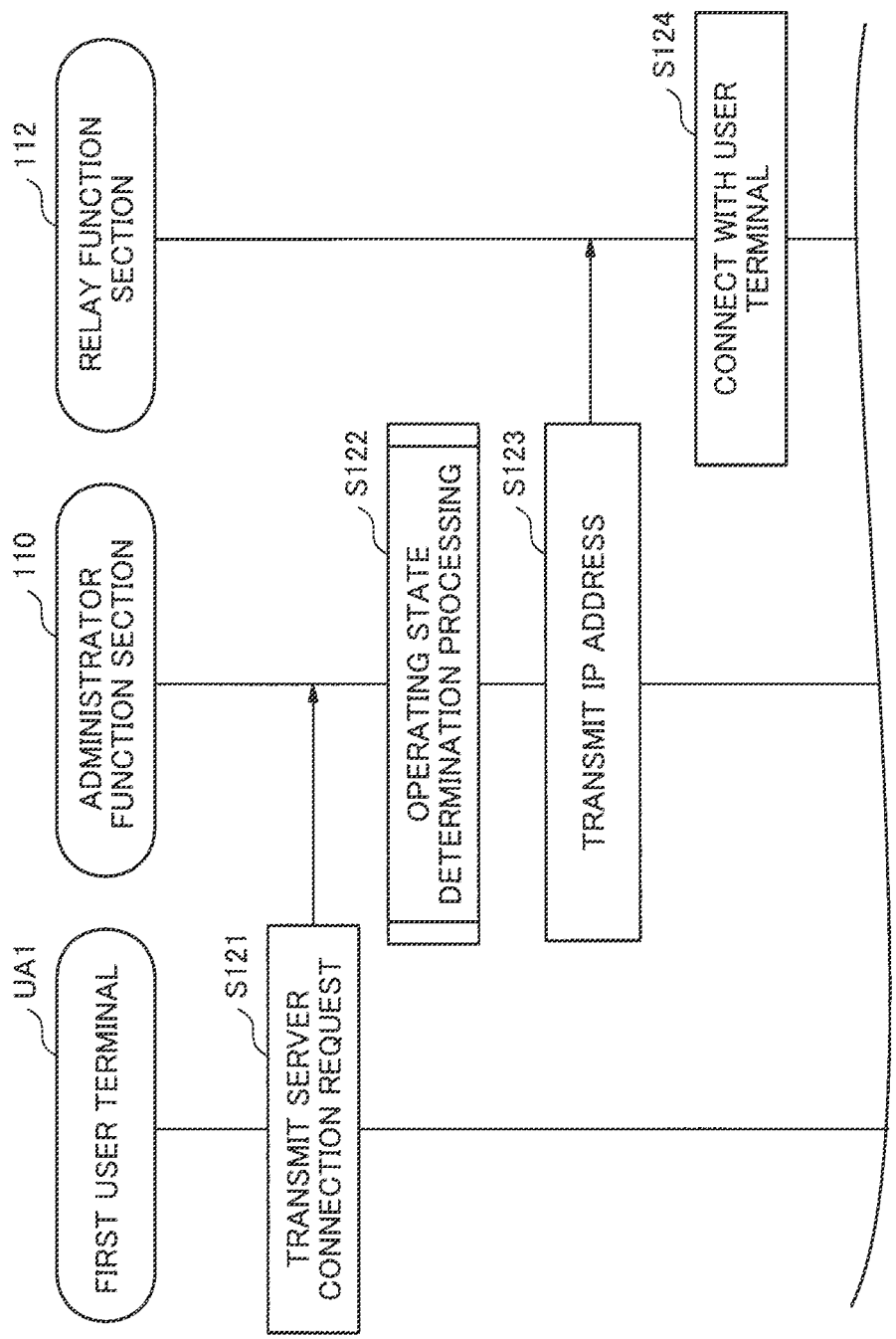
FIG. 6 is a sequence diagram depicting operation of the information processing system according to the first embodiment of the present invention.

Next, as depicted in FIG. 6, the first user terminal UA1 transmits a server connection request to the administrator function section 110 that manages the relay function section 112 designated by the received communication destination IP address (step S121). As such, the administrator function section 110 receives the server connection request. Then, the administrator function section 110 performs the operating state determination processing for the relay function section 112 (step S122). That is, the administrator function section 110 performs the same processing as the processing depicted in FIG. 5 for the relay function section 112.

As the result of the operating state determination processing of step S122, when the load of the relay function section 112 is a preset threshold or lower, and no fault has occurred in the relay function section 112, the administrator function section 110 transmits the communication destination IP address included in the server connection request and the IP address (communication source IP address) of the first user terminal UA1 (communication source user terminal) to the relay function section 112 (step S123).

As such, the relay function section 112 receives the IP addresses (the communication source IP address and the communication destination IP address). Then, the relay function section 112 connects with the user terminal based on the received IP addresses (step S124).

Note that, as the result of the operating state determination processing of step S122, if the load of the relay function section 112 is larger than the preset threshold or a fault has occurred in the relay function section 112, the administrator function section 110 detects the information processing unit with the shortest distance from the information processing unit 10 and instructs the information processing unit (or, the relay function section 112 included therein) to relay communications among the plurality of user terminals. As such, a delay associated with relaying communications can be reduced.

Then, the another information processing unit that was instructed to relay the communications by the information processing unit relays the communications among the plurality of user terminals. During this time, the session between the information processing unit and the another information processing unit is maintained. Therefore, when a user terminal accesses the information processing unit, the user terminal is automatically transferred to the other information processing unit. As such, even when congestion or the like occurs in the information processing unit, the user who is operating the user terminal can securely communicate information with the other user terminal without performing predetermined operation.

Figure 7:
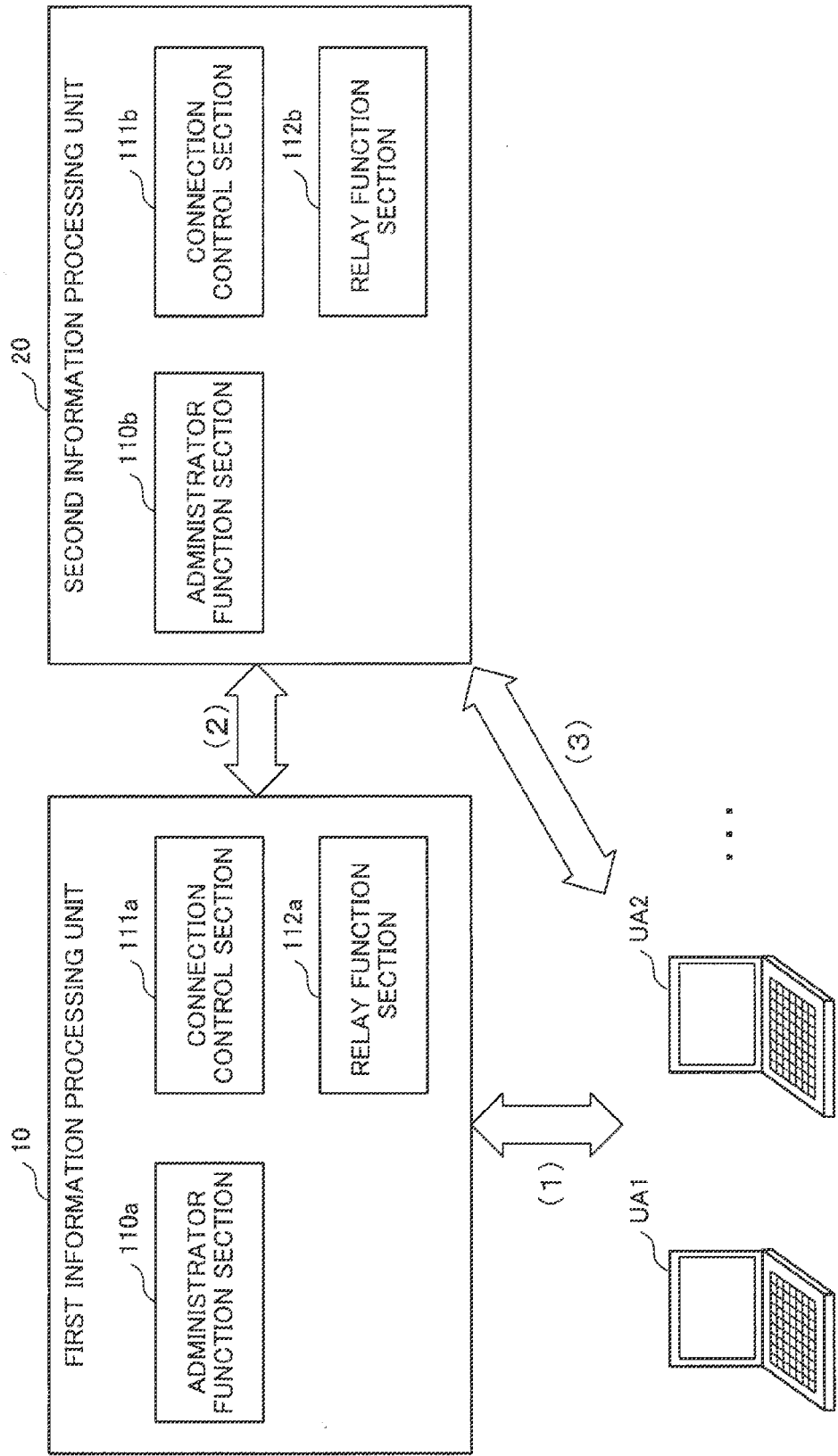
FIG. 7 is a diagram illustrating schematic operation of the information processing system according to the first embodiment of the present invention.

As such, when operation inside the information processing unit 10 is normal, the information processing unit 10 performs predetermined communication processing with the plurality of user terminals (e.g., as depicted in (1) of FIG. 7). Whereas, when the load within the information processing unit 10 increases, or when a fault occurs in the information processing unit 10 leading to possible congestion in the communications among the plurality of user terminals, the information processing unit 10 instructs another information processing unit to process the communications (e.g., as depicted in (2) of FIG. 7), and switches the information processing unit that performs the communication processing. Then, the another information processing unit performs predetermined communication processing among the plurality of user terminals via the information processing unit (e.g., as depicted in (3) of FIG. 7). Therefore, predetermined information can be securely communicated among the plurality of user terminals.

Further, a user terminal can connect with other information processing units all around the world via the information processing unit. Thus, even in the event of a disaster or when the function of an information processing unit in a certain area is paralyzed, communications among the user terminals can be secured without causing congestion.

Second Exemplary Embodiment

Next, the information processing system according to the second embodiment of the present invention will be described. The information processing system according to the second embodiment is different from the information processing system according to the above-described first embodiment in that each functional section in an information processing unit is newly generated. Thus, the following will primarily describe such a difference.
(Configuration)

Figure 8:
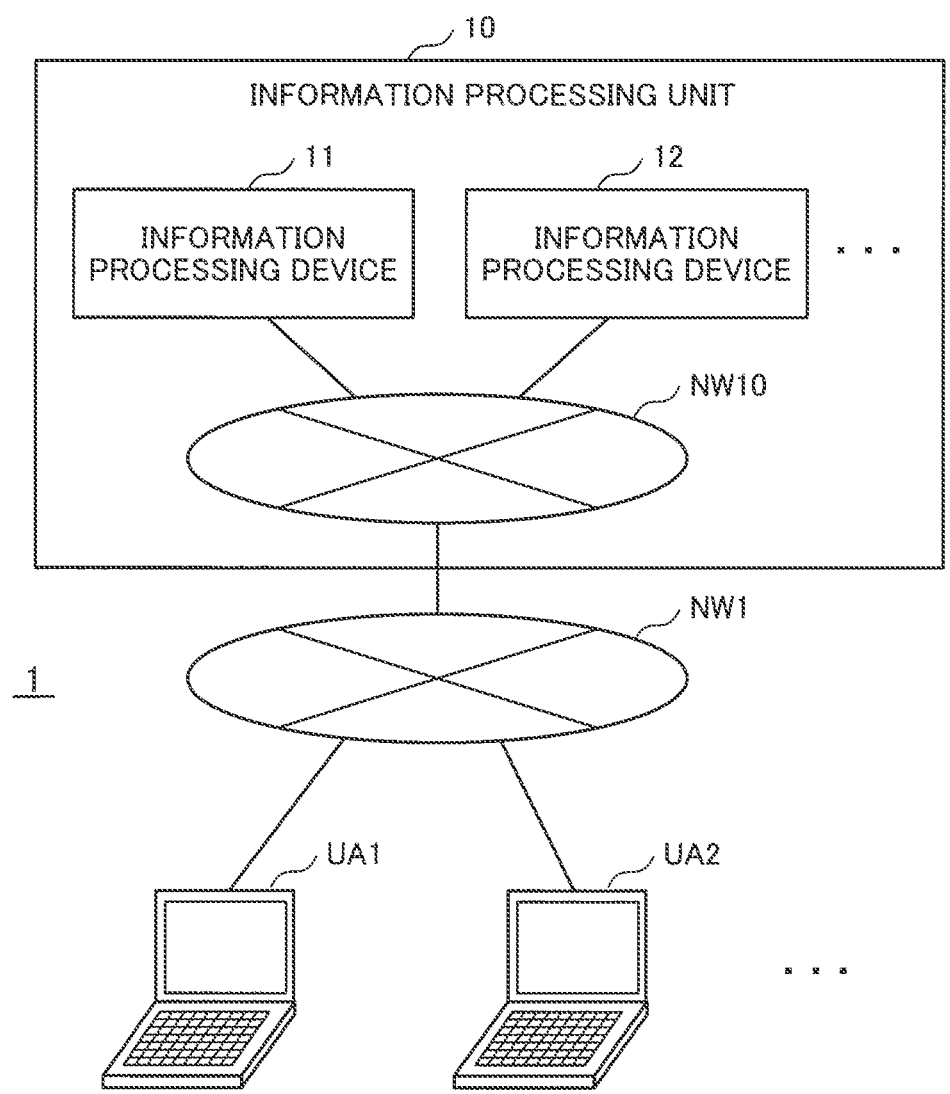
FIG. 8 is a diagram depicting a configuration of an information processing system according to a second embodiment of the present invention.

As depicted in FIG. 8, the information processing system 1 according to the second embodiment contains: an information processing unit 10 and a plurality of user terminals UA1, UA2, . . . . The information processing system 1 is configured to provide a service to the plurality of user terminals UA1, UA2, . . . that are connected via a user-side communication network NW1 and an in-unit communication network NW10, which configure IP networks. The information processing unit 10 contains a plurality of information processing devices 11, 12, . . . . The plurality of information processing devices 11, 12, . . . are communicably connected to one another via the in-unit communication network NW 10.

Figure 9:
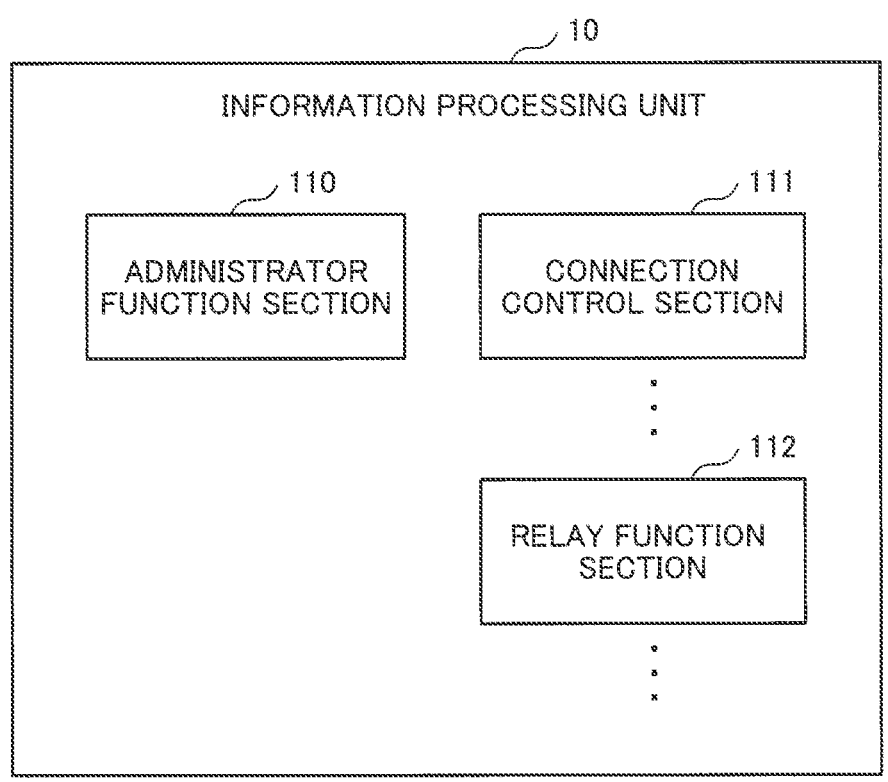
FIG. 9 is a block diagram depicting functions of an information processing unit according to the second embodiment of the present invention.
Figure 10:
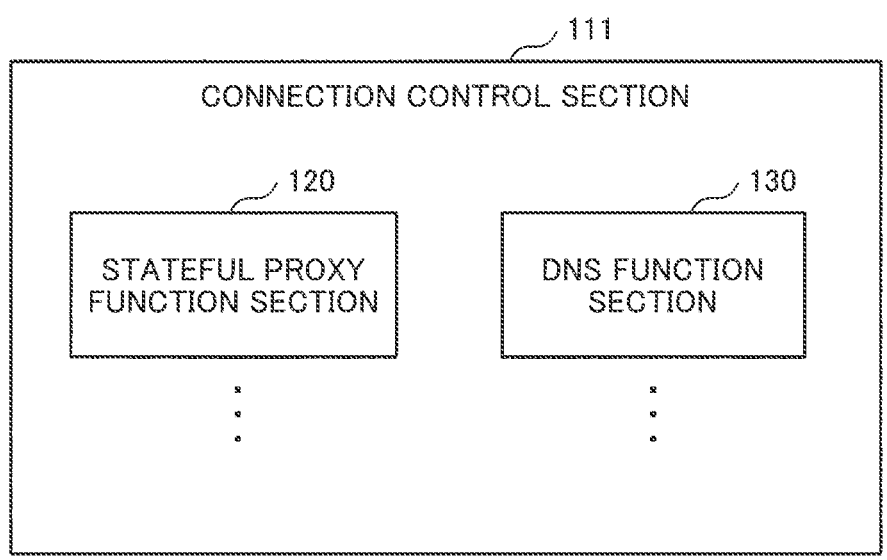
FIG. 10 is a block diagram depicting functions of a connection control section according to the second embodiment of the present invention.

As depicted in FIG. 9, the functions of the information processing unit 10 include an administrator function section 110 (a control section), a connection control section 111, and a relay function section 112. Further, as depicted in FIG. 10, the connection control section 111 includes a stateful proxy function section 120 and a DNS function section 130.

The administrator function section 110 acquires the operating state of the information processing unit 10 (the connection control section 111 and the relay function section 112 (hereinafter, referred to as the service providing section)) and, according to the acquired operating state, generates a new service providing section. Note that the administrator function section 110 may separately generate the connection control section 111, the relay function section 112, the stateful proxy function section 120, and the DNS function section 130. The following will specifically describe the details.

For example, the administrator function section 110 acquires load information that indicates the load of the connection control section 111. Note that the acquiring load may be a total or an average value of the loads of the plurality of connection control sections 111. Alternatively, the acquiring load may be the maximum value or the minimum value of the loads of the plurality of connection control sections 111. The same goes to the other components as will be described below. When the load indicated by the acquired load information is larger than a predefined first connection control load threshold, the administrator function section 110 newly generates a connection control section 111. As such, occurrence of congestion can be securely avoided. Further, excessive generation of the connection control sections 111 can be prevented.

Further, the administrator function section 110 detects occurrence of a fault in the connection control section 111 (acquires whether or not a fault has occurred). When occurrence of a fault is detected in the connection control section 111, the administrator function section 110 newly generates a connection control section 111. As such, connections among the user terminals UA1, UA2, . . . can be further secured.

Likewise, the administrator function section 110 acquires load information that indicates the load of the relay function section 112. When the load indicated by the acquired load information is larger than a predefined first relay load threshold, the administrator function section 110 newly generates a relay function section 112. As such, occurrence of congestion can be securely avoided. Further, excessive generation of the relay function sections 112 can be prevented.

Further, the administrator function section 110 detects occurrence of a fault in the relay function section 112. When occurrence of a fault is detected in the relay function section 112, the administrator function section 110 newly generates a relay function section 112. As such, the communications among the user terminals UA1, UA2, . . . can be securely relayed.

Further, the administrator function section 110 acquires load information that indicates the load of the stateful proxy function section 120. When the load indicated by the acquired load information is larger than a predefined first stateful proxy load threshold, the administrator function section 110 newly generates a stateful proxy function section 120. As such, occurrence of congestion can be securely avoided. Further, excessive generation of the stateful proxy function sections 120 can be prevented.

Further, the administrator function section 110 detects occurrence of a fault in the generated stateful proxy function section 120. When occurrence of a fault is detected in the stateful proxy function section 120, the administrator function section 110 newly generates a stateful proxy function section 120. As such, connections among the user terminals UA1, UA2, . . . can be secured. Further, excessive generation of the stateful proxy function sections 120 can be prevented.

In addition, the administrator function section 110 acquires load information that indicates the load of the generated DNS function section 130. When the load indicated by the acquired load information is larger than a predefined first DNS load threshold, the administrator function section 110 newly generates a DNS function section 130. As such, occurrence of congestion can be securely avoided. Further, excessive generation of the DNS function sections 130 can be prevented.

Further, the administrator function section 110 detects occurrence of a fault in the generated DNS function section 130. When occurrence of a fault is detected in the DNS function section 130, the administrator function section 110 newly generates the DNS function section 130. As such, connections among the user terminals UA1, UA2, . . . can be secured. Further, excessive generation of the DNS function sections 130 can be prevented.

On the other hand, the administrator function section 110 eliminates the service providing section (the connection control section 111 and the relay function section 112), the stateful proxy function section 120, and the DNS function section 130.

In particular, in a case where a plurality of connection control sections 111 were generated, if the total load of the plurality of connection control sections 111 is smaller than a predefined second connection control load threshold, the administrator function section 110 eliminates one of the connection control sections 111.

Likewise, in a case where a plurality of relay function sections 112 were generated, if the total load of the plurality of relay function sections 112 is smaller than a predefined second relay load threshold, the administrator function section 110 eliminates the relay function sections 112 that are not connected to the user terminals UA1, UA2, . . . .

Likewise, in a case where a plurality of stateful proxy function sections 120 were generated, if the total load of the plurality of stateful proxy function sections 120 is smaller than a predefined second stateful proxy load threshold, the administrator function section 110 eliminates one of the stateful proxy function sections 120.

Likewise, in a case where a plurality of DNS function sections 130 were generated, if the total load of the plurality of DNS function sections 130 is smaller than a predefined second DNS load threshold, the administrator function section 110 eliminates one of the DNS function sections 130.

The administrator function section 110 transmits (outputs) the identification information included in the connection request notification received from the user terminal UA1, UA2, . . . to the connection control section 111 (the stateful proxy function section 120). The administrator function section 110 is configured, when a plurality of connection control sections 111 (or stateful proxy function sections 120) were generated, to transmit the identification information to the connection control section 111 with the smallest load.

The stateful proxy function section 120 receives the identification information transmitted from the administrator function section 110. The stateful proxy function section 120 transmits (outputs) the received identification information to the DNS function section 130. The stateful proxy function section 120 is configured, when a plurality of DNS function sections 130 are generated, to transmit the identification information to the DNS functions section 130 with the smallest load.

(Operation)

Next, the operation of the above-described information processing system 1 will be described. Note that the operation of the information processing system 1 of the second embodiment is the same as the first embodiment, thus, the operation will be described with reference to FIG. 4.

First, as depicted in FIG. 4, the first user terminal UA1 transmits a connection request notification that includes identification information for identifying the second user terminal UA2 (or, the relay function section 112) to the administrator function section 110 (step S101).

As such, the administrator function section 110 receives the connection request notification. Then, the administrator function section 110 performs the operating state determination processing for the connection control section 111 (step S102). The operating state determination processing of the second embodiment will be described with reference to FIG. 11. Note that the processing of FIG. 11 may be performed at every preset execution cycle. Further, the administrator function section 110 also performs the same processing as the processing as will be described below for the stateful proxy function section 120 and the DNS function section 130, at every preset execution cycle.

Figure 11:
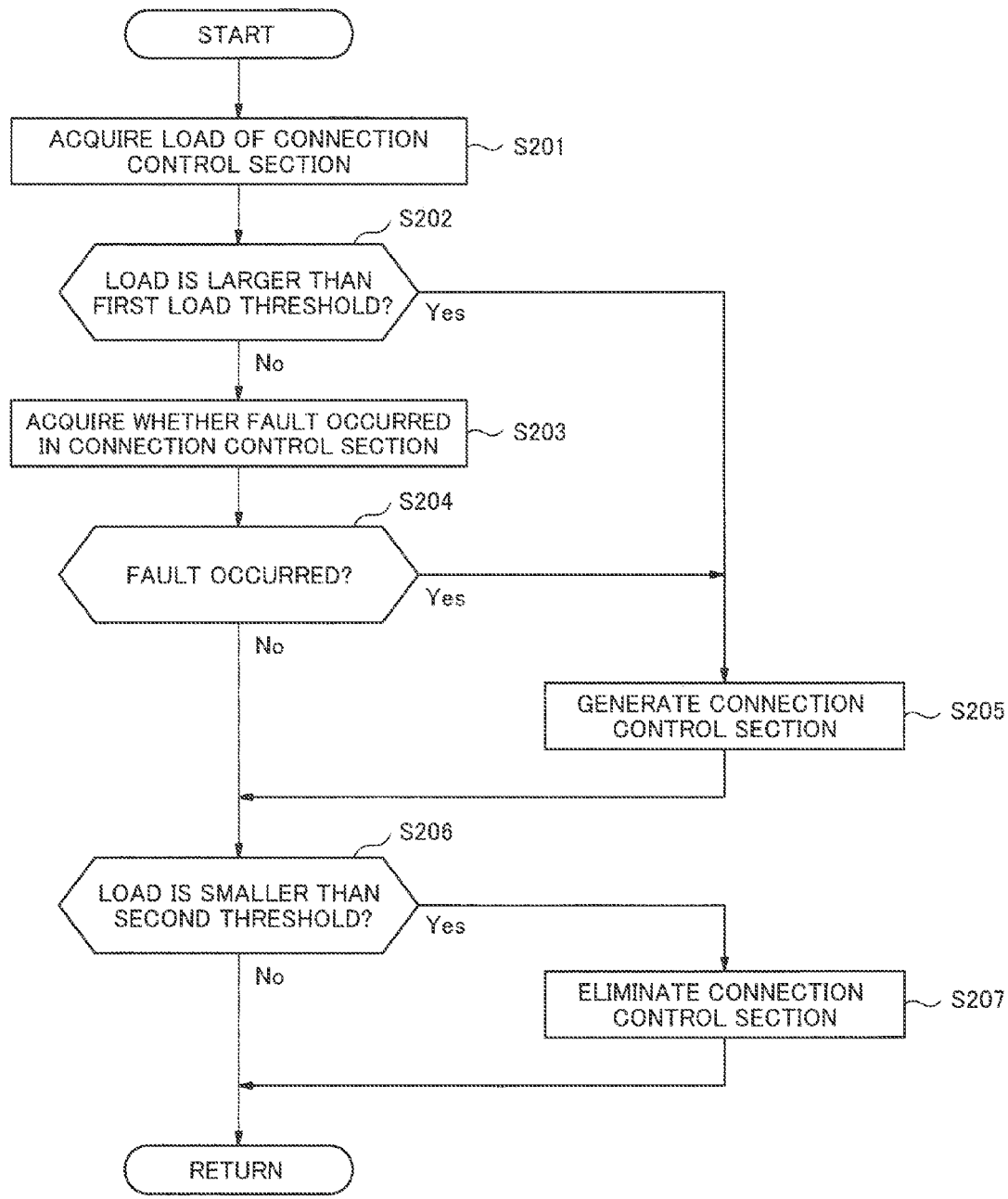
FIG. 11 is a flowchart depicting processing that an administrator function section performs according to the second embodiment of the present invention.

As depicted in FIG. 11, the administrator function section 110, first, acquires the load of the connection control section 111 (step S201). The acquiring load may be a total or an average value of the loads of a plurality of connection control sections 111. Further, the acquiring load may be the maximum value or the minimum value of the loads of the plurality of connection control sections 111. Subsequently, whether or not the acquired load is larger than a preset first load threshold (a first connection control load threshold) is determined (step S202).

When the load is determined as not larger than the first load threshold (step S202: No), the administrator function section 110 acquires whether a fault has occurred in the connection control section 111 (detects a fault) (step S203). When occurrence of a fault is determined (step S204: Yes), and when the load is determined as larger than the load threshold (step S202: Yes), the administrator function section 110 newly generates a connection control section 111 (step S205).

On the other hand, when non-occurrence of a fault is determined (step S204: No), whether or not the load of the connection control section 111 is smaller than the second load threshold (the second connection control load threshold) is determined (step S206). Note that when there is only a single connection control section 111, the steps of S206, S207 can be skipped.

When the load of the connection control sections 111 is determined as smaller than the load threshold (step S206: No), the administrator function section 110 eliminates one of the connection control sections 111 (step S207).

When the load of the connection control sections 111 is determined as larger than the load threshold (step S206: Yes), or, after the processing of step S207, the processing depicted in FIG. 11 terminates and the processing returns to FIG. 4. That is, as the result of the operating state determination processing of step S102, when the load of the connection control sections 111 is the preset threshold or lower, and no fault has occurred in the connection control sections 111, the administrator function section 110 transmits the identification information included in the connection request notification to the stateful proxy function section 120 (step S103).

As such, the stateful proxy function section 120 receives the identification information. Then, the stateful proxy function section 120 transmits the identification information to the DNS function section 130 (step S104).

As such, the DNS function section 130 receives the identification information. Then, the DNS function section 130 acquires the IP address stored in association with the identification information as the communication destination IP address. Subsequently, the DNS function section 130 transmits the communication destination IP address to the stateful proxy function section 120 (step S105).

As such, the stateful proxy function section 120 receives the communication destination IP address. Then, the stateful proxy function section 120 transmits the communication destination IP address to the first user terminal UA1 (step S106). As such, the user terminal UA1 receives the communication destination IP address.

Next, as depicted in FIG. 6, the first user terminal UA1 transmits a server connection request that includes the received communication destination IP address to the administrator function section 110 (step S121). As such, the administrator function section 110 receives the server connection request. Then, the administrator function section 110 performs the operating state determination processing for the relay function section 112 (step S122). That is, the administrator function section 110 performs the same processing as the processing depicted in FIG. 11 for the relay function section 112.

As the result of the operating state determination processing of step S122, when the load of the relay function section 112 is a preset threshold or lower, and no fault has occurred in the relay function section 112, the administrator function section 110 transmits the communication destination IP address included in the server connection request and the IP address (communication source IP address) of the first user terminal UA1 (communication source user terminal) to the relay function section 112 (step S123).

As such, the relay function section 112 receives the IP addresses (the communication destination IP address and the communication source IP address). Then, the relay function section 112 connects with the user terminal based on the received IP addresses (step S124).

As described above, according to the information processing system 1 of the second embodiment, when the load of the connection control section 111 is high, or when a fault has occurred in the connection control section 111, the administrator function section 110 can newly generate a connection control section 111.

Likewise, when the load of the relay function section 112 is high, or when a failure has occurred in the relay function section 112, the administrator function section 110 can newly generate a relay function section 112.

Likewise, when the load of the stateful proxy function section 120 is high, or when a fault has occurred in the stateful proxy function section 120, the administrator function section 110 can newly generate a stateful proxy function section 120.

Further, in the same way, when the load of the DNA function section 130 is high, or when a fault has occurred in the DNS function section 130, the administrator function section 110 can newly generate a DNS function section 130.

Therefore, for example, even when many user terminals UA1, UA2, . . . are transmitting connection request notifications and communications among many user terminals UA1, UA2, . . . are relayed, the information processing system 1 can enable the user terminals UA1, UA2, . . . to securely perform the communication processing.

First Variation of Second Exemplary Embodiment

Next, the information processing system according to a first variation of the second embodiment of the present invention will be described. The information processing system according to the first variation of the second embodiment is different from the information processing system according to the above-described second embodiment in that the information processing system contains a plurality of administrator function sections. Therefore, the following will primarily describe such a difference.

Figure 12:
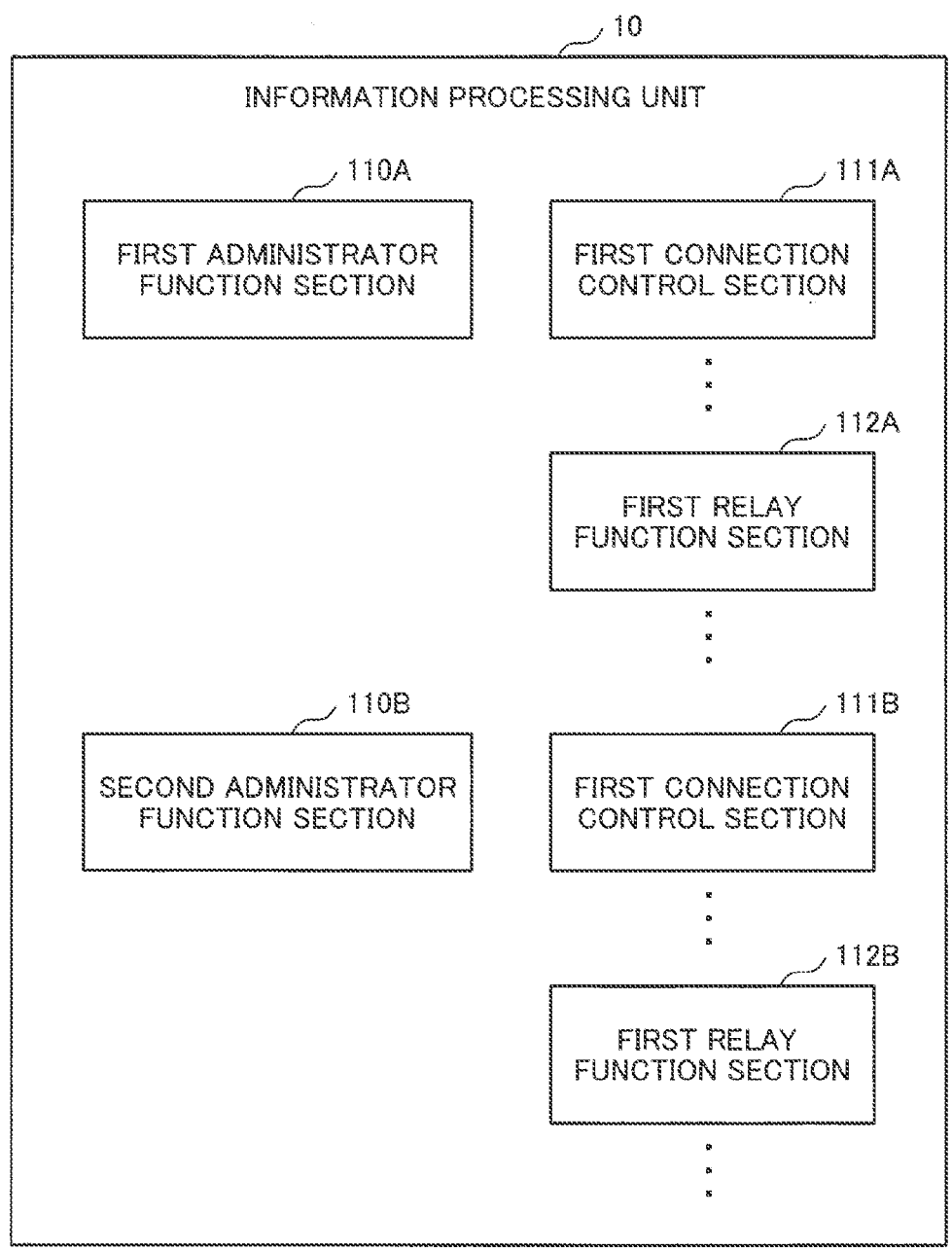
FIG. 12 is a block diagram depicting functions of an information processing unit according to a first variation of the second embodiment of the present invention.

As depicted in FIG. 12, the functions of the information processing unit 10 according to the first variation include a plurality of (two, in the example of the first variation) administrator function sections 110A, 110B. Note that the functions of the information processing unit 10 may include three or more administrator function sections.

The administrator function section 110A is also referred to as the first administrator function section (the first control section). The administrator function section 110B is also referred to as the second administrator function section (the second control section).

Further, the service providing section generated by the first administrator function section 110A is also referred to as the first service providing section A (a first connection control section 111A and a first relay function section 112A). Likewise, the stateful proxy function section 120 generated by the first administrator function section 110A is also referred to as the first stateful proxy function section 120A. Further in the same way, the DNS function section 130 generated by the first administrator function section 110A is also referred to as the first DNS function section 130A.

Further, the service providing section generated by the second administrator function section 110B is also referred to as the second service providing section B (a second connection control section 111B and a second relay function section 112B). Likewise, the stateful proxy function section 120 generated by the second administrator function section 110B is also referred to as the second stateful proxy function section 120B. Further in the same way, the DNS function section 130 generated by the second administrator function section 110B is also referred to as the second DNS function section 130B.

The first administrator function section 110A acquires the whole operating state that indicates all operating states of the first service providing section A (i.e., the first connection control section 111A (the first stateful proxy function section 120A and the DNS function section 130A) and the first relay function section 112A) that the first administrator function section 110A has generated. Then, according to the acquired whole operating state, the first administrator function section 110A transmits (outputs) a generation request that requests generation of a service providing section to the second administrator function section.

The second administrator function section 110B receives the first generation request that is transmitted from the first administrator function section 110A. When receiving the first generation request, the second administrator function section 110B newly generates a second service providing section B.

Note that each of the plurality of administrator function sections 110 may separately generate the connection control section 111, the relay-function section 112, the stateful proxy function section 120, and the DNS function section 130.

For example, the first administrator function section 110A acquires the whole load information that indicates the load of the first connection control section 111A that the first administrator function section 110A generated. In the example of the first variation, the whole load information is information that indicates the total load of the first connection control section 111A. Note that the whole load information may be an average value of the loads of a plurality of first connection control sections 111. Further, the whole load information may be the maximum value or the minimum value of the loads of the plurality of first connection control sections 111.

When the load indicated by the acquired whole load information is larger than a predefined first whole load threshold, the first administrator function section 110A transmits (outputs) a first generation request that requests generation of a connection control section 111 to the second administrator function section 110B.

The second administrator function section 110B receives the first generation request that was transmitted from the first administrator function section 110A. When receiving the first generation request, the second administrator function section 110B generates a second connection control section 111B.

As such, occurrence of congestion can be securely avoided. Further, excessive generation of the connection control sections 111 can be prevented.

Note that, when receiving the connection request notification, the first administrator function section 110A and the second administrator function section 110B transmit the identification information included in the connection request notification to the connection control section 111 with the smallest load among the first connection control section 111A and the second connection control section 111B.

Likewise, the first administrator function section 110A acquires the whole load information that indicates all loads of the relay function sections 112 that the first administrator function section 110A generated (i.e., the first relay function sections 112A). In the example of the first variation, the whole load information is information that indicates the total load of the first relay function sections 112A.

When the load indicated by the acquired whole load information is larger than a predefined second whole load threshold, the first administrator function section 110A transmits (outputs) a second generation request that requests generation of a relay function section 112 to the second administrator function section 110B.

The second administrator function section 110B receives the second generation request that was transmitted from the first administrator function section 110A. When receiving the second generation request, the second administrator function section 110B generates a second relay-function section 112B.

As such, occurrence of congestion can be securely avoided. Further, excessive generation of the relay function sections 112 can be prevented.

Note that, when receiving the identification information, the first administrator function section 110A and the second administrator function section 110B transmit the IP addresses included in the server connection request to the relay function section 112 with the smallest load among the first relay function section 112A and the second relay function section 112B.

Likewise, the first administrator function section 110A acquires the whole load information that indicates all loads of the stateful proxy function sections 120 that the first administrator function section 110A generated (i.e., the first stateful proxy function sections 120A). In the example of the first variation, the whole load information is information that indicates the total load of the first stateful proxy function sections 120A.

When the load indicated by the acquired whole load information is larger than a predefined second whole load threshold, the first administrator function section 110A transmits (outputs) the second generation request that requests generation of the stateful proxy function section 120 to the second administrator function section 110B.

The second administrator function section 110B receives the second generation request that was transmitted from the first administrator function section 110A. When receiving the second generation request, the second administrator function section 110B generates a second stateful proxy function section 120B.

As such, occurrence of congestion can be securely avoided. Further, excessive generation of the stateful proxy function sections 120 can be prevented.

Note that, when receiving the identification information, the first administrator function section 110A and the second administrator function section 110B transmit the identification information included in the connection request notification to the stateful proxy function section 120 with the smallest load among the first stateful proxy function section 120A and the second stateful proxy function section 120B.

Further, in the same way, the first administrator function section 110A acquires the whole load information that indicates all loads of the DNS function sections 130 that the first administrator function section 110A generated (i.e., the first DNS function section 130A). In the example of the first variation, the whole load information is information that indicates the total load of the first DNS function sections 130A.

When the load indicated by the acquired whole load information is larger than a predefined second threshold whole load, the first administrator function section 110A transmits (outputs) a second generation request that requests generation of a DNS function section 130 to the second administrator function section 110B.

The second administrator function section 110B receives the second generation request that was transmitted from the first administrator function section 110A. When receiving the second generation request, the second administrator function section 110B generates a second DNS function section 130B.

As such, occurrence of congestion can be securely avoided. Further, excessive generation of the DNS function sections 130 can be prevented.

When receiving the identification information, the stateful proxy function section 120 transmits the identification information to the DNS function section 130 with the smallest load among the first DNS function section 130A and the second DNS function section 130B.

As described above, the information processing system 1 according to the first variation of the second embodiment can also provide the same influences and effects as the information processing system 1 according to the second embodiment. Further, the load of each administrator function section can also be decreased.

Third Exemplary Embodiment

Next, the information processing system according to the third embodiment of the present invention will be described.

The information processing system according to the third embodiment is different from the information processing system according to the above-described second embodiment in that the information processing system contains a plurality of information processing units. Therefore, the following will primarily describe such a difference.

(Configuration)

Figure 13:
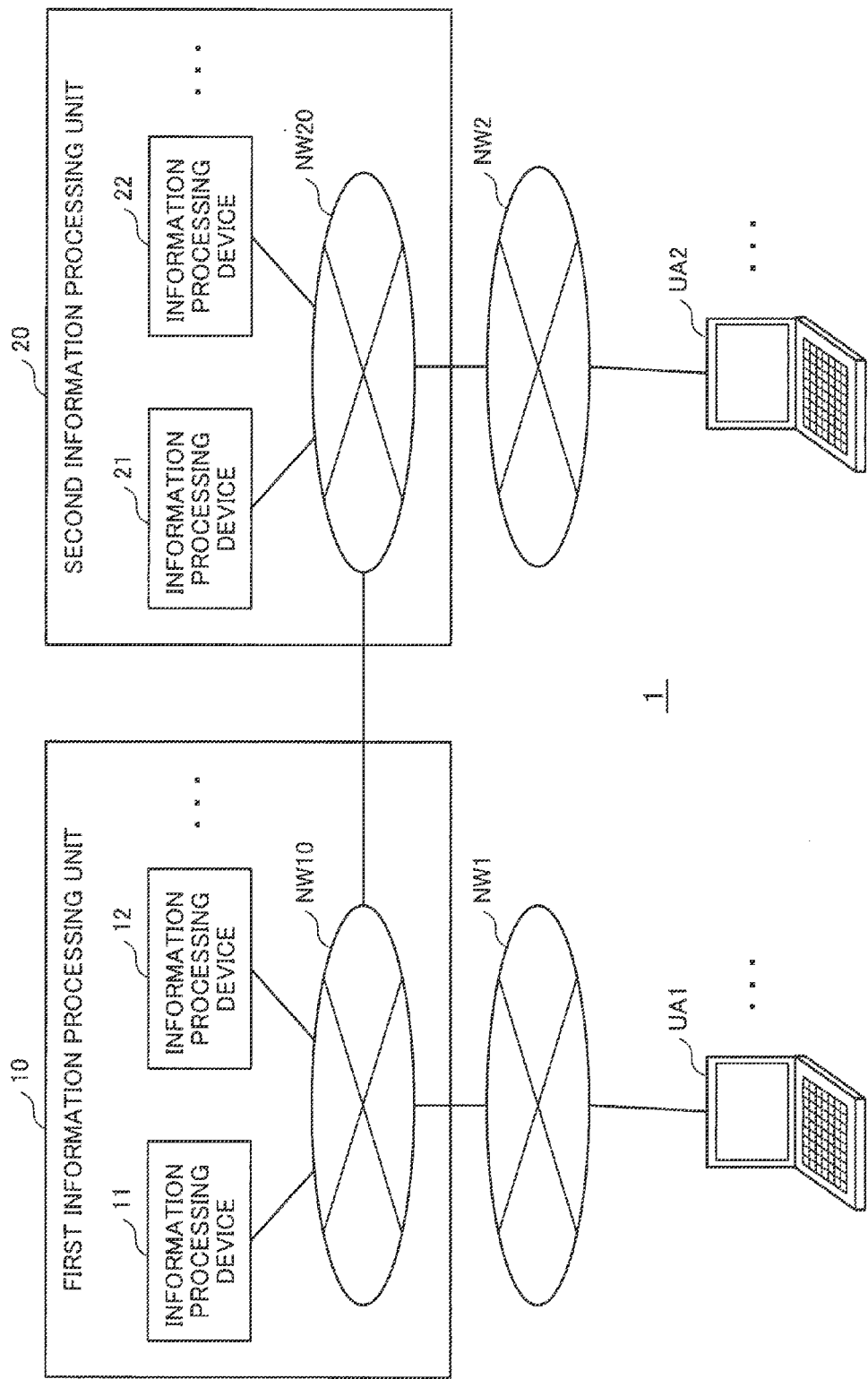
FIG. 13 is a diagram depicting a configuration of an information processing system according to a third embodiment of the present invention.

As depicted in FIG. 13, the information processing system 1 according to the third embodiment contains a plurality of information processing units that include a first information processing unit 10 and a second information processing unit 20. Note that the information processing system 1 may contain three or more information processing units.

The first information processing unit 10 contains a plurality of information processing devices 11, 12, . . . . The plurality of information processing devices 11, 12, . . . are communicably connected to one another via a first in-unit communication network NW10. Further, the first user terminal UA1 is connected to the first in-unit communication network NW10 via a first user-side communication network NW1.

Likewise, the second information processing unit 20 contains a plurality of information processing devices 21, 22, . . . . The plurality of information processing devices 21, 22, . . . are communicably connected to one another via a second in-unit communication network NW20. Further, the second user terminal UA2 is connected to the second in-unit communication network NW20 via a second user-side communication network NW2.

The functions of the second information processing unit 20 include: an administrator function section 210 that is the same as the administrator function section 110; a stateful proxy function section 220, the same as the stateful proxy function section 120; a DNS function section 230, the same as the DNS function section 130; and a location server function section 240, the same as the location server function section 140.

Further, the first in-unit communication network NW10 and the second in-unit communication network NW20 are connected to each other.

Figure 14:
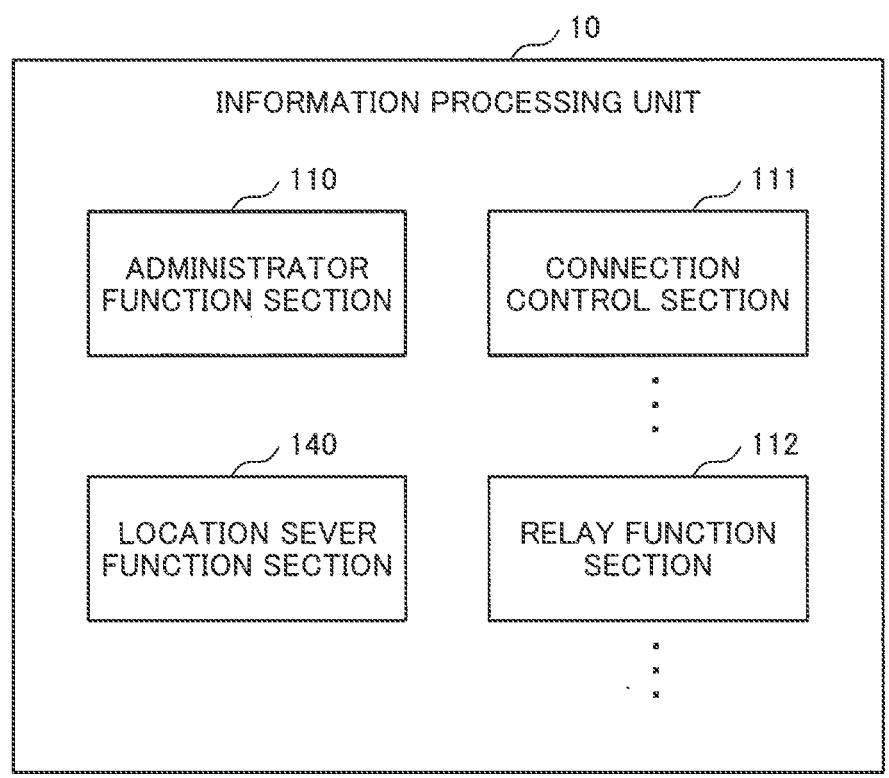
FIG. 14 is a block diagram depicting functions of an information processing unit according to the third embodiment of the present invention.

As depicted in FIG. 14, the functions of the first information processing unit 10 include a location server function section 140 in addition to the functions of the information processing unit 10 according to the second embodiment. Note that the location server function section 140 cars also be applied to other embodiments.

The location server function section 140 stores identification information for identifying the user terminals UA1, UA2, . . . , and unit specific information for specifying the information processing units 10, 20 to which the user terminals UA1, UA2, . . . are connected, in association with each other.

When the IP address allocated to the identification information included in the connection request notification is not transmitted (output) from the DNS function section 130, that is, when the identification information is not stored in the DNS function section 130, the stateful proxy function section 120 transmits (outputs) the identification information to the location server function section 140.

The location server function section 140 transmits (outputs) the unit specific information that is stored in association with the identification information transmitted from the stateful proxy function section 120 to the stateful proxy function section 120. The unit specific information is information uniquely allocated to each of the plurality of information processing units.

The stateful proxy function section 120 transmits a connection request that includes a telephone number included in an outgoing call notification to the administrator function section 110 provided in the another information processing unit (e.g., the second information processing unit 20) specified by the unit specific information transmitted from the location server function section 140.

When receiving the connection request from the information processing unit 10, the administrator function section 210 of the another information processing unit transmits (outputs) the identification information included in the connection request to the stateful proxy function section 220.

The stateful proxy function section 220 establishes a session between the communication destination IP address that is the IP address transmitted from the DNS function section 230 and the communication source IP address that is the IP address allocated to the communication source user terminal, by cooperating with the information processing unit 10 that is the transmission source of the connection request. Further, the stateful proxy function section 220 transmits the communication destination IP address to the communication source user terminal by cooperating with the information processing unit 10 that is the communication source of the connection request.

(Operation)

Next, the operation of the above-described information processing system 1 will be described. First, in the same way as the second embodiment, the first user terminal UA1 transmits a connection request notification that includes identification information for identifying the second user terminal UA2 to the administrator function section 110 of the first information processing unit 10.

As such, the administrator function section 110 receives the connection request notification. Then, the administrator function section 110 transmits the identification information included in the connection request notification to the stateful proxy function section 120.

As such, the stateful proxy function section 120 receives the identification information. Then, the stateful proxy function section 120 transmits the identification information to the DNS function section 130.

As such, the DNS function section 130 receives the identification information. Then, the DNS function section 130 attempts to acquire the IP address stored in association with the identification information. Note that, in the third embodiment, the second user terminal UA2 is connected to the second information processing unit 20. Therefore, the DNS function section 130 cannot acquire the IP address stored in association with the identification information.

Figure 15:
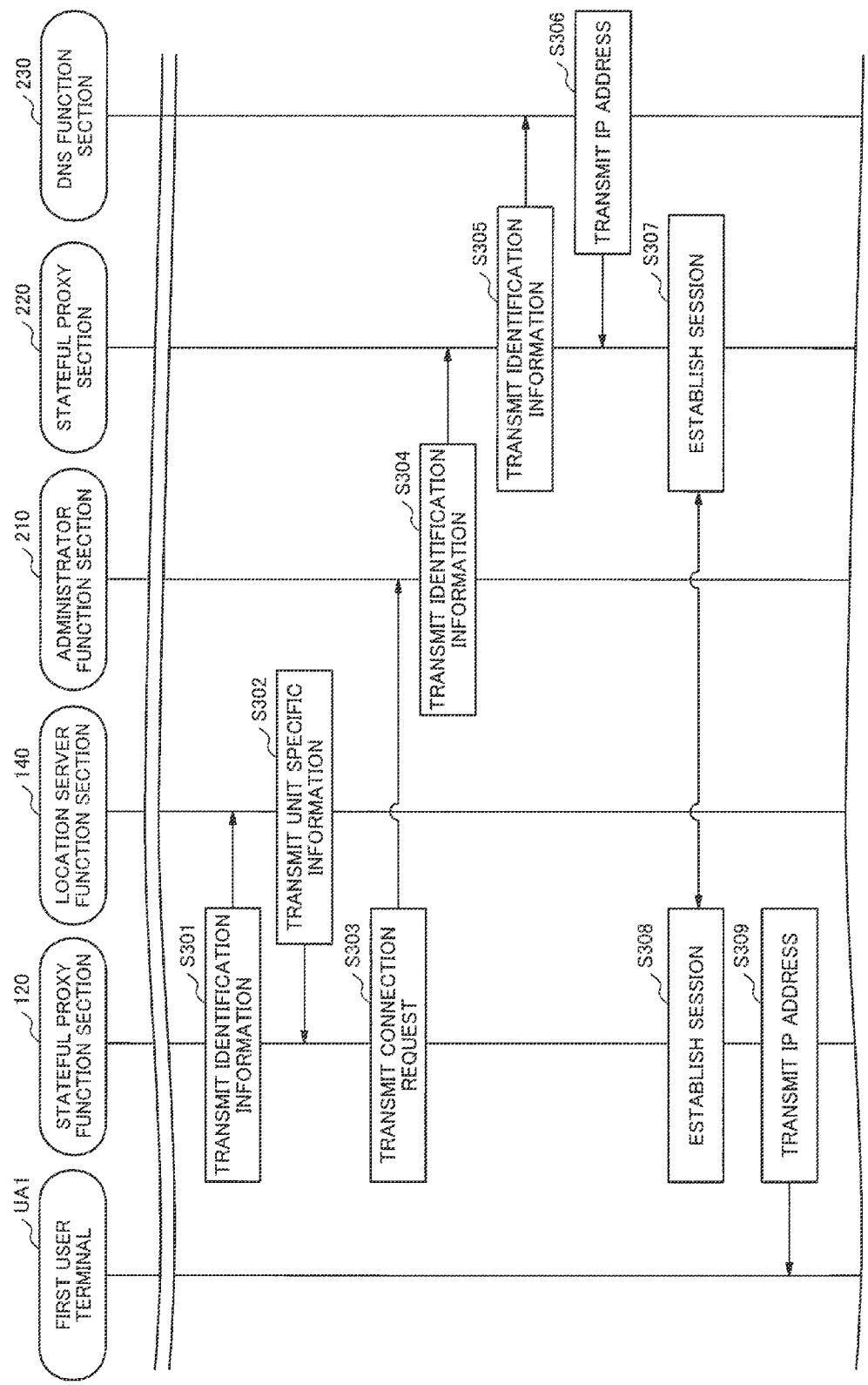
FIG. 15 is a sequence diagram depicting operation of the information processing system according to the third embodiment of the present invention.

As depicted in FIG. 15, when the communication destination IP address is not transmitted from the DNS function section 130, the stateful proxy function section 120 transmits the identification information to the location server function section 140 (step S301).

As such, the location server function section 140 receives the identification information. Then the location server function section 140 acquires the unit specific information that is stored in association with the identification information. The location server function section 140 transmits the acquired unit specific information to the stateful proxy function section 120 (step S302).

As such, the stateful proxy function section 120 receives the unit specific information. Then, the stateful proxy function section 120 transmits a connection request that includes the identification information included in the connection request notification to the administrator function section 210 that is provided in the information processing unit (the second information processing unit 20 in the third embodiment) specified by the unit specific information (step S303).

As such, the administrator function section 210 of the second information processing unit 20 receives the connection request. Then, the administrator function section 210 transmits the telephone number included in the connection request to the stateful proxy function section 220 (step S304).

As such, the stateful proxy function section 220 receives the identification information. Then, the stateful proxy function section 220 transmits the identification information to the DNS function section 230 (step S305).

As such, the DNS function section 230 receives the identification information. Then, the DNS function section 230 acquires the IP address stored in association with the identification information as the communication destination IP address. Next, the DNS function section 230 transmits the communication destination IP address to the stateful proxy function section 220 (step S306).

As such, the stateful proxy function section 220 receives the incoming call destination IP address. Then, the stateful proxy function section 220 establishes a session between the communication destination IP address and the IP address allocated to the communication source user terminal (communication source IP address) by cooperating with the information processing unit that is the transmission source of the connection request (the stateful proxy function section 120 of the first information processing unit 10 in the third embodiment) according to SIP (steps S307, S308).

Further, the stateful proxy function section 220 transmits the communication destination IP address to the first user terminal UA1 by cooperating with the information processing unit that is the transmission source of the connection request (the stateful proxy function section 120 of the first information processing unit 10 in the third embodiment) according to SIP (step S309).

As such, the first user terminal UA1 receives the communication destination IP address. Then, the first user terminal UA1 performs communication processing with the second user terminal UA2 to which the communication destination IP address is allocated.

As such, the user of the first user terminal UA1 and the user of the second user terminal UA2 can communicate predetermined information.

As described above, the information processing system 1 according to the third embodiment of the present invention can also provide the same influences and effects as the information processing system 1 according to the second embodiment. Further, according to the information processing system 1 of the second embodiment, the communication processing can be securely performed between the user terminals UA1 and UA2 that are respectively connected to the plurality of information processing units 10 and 20.

Fourth Exemplary Embodiments

Next, the information processing system according to the fourth embodiment of the present invention will be described. The information processing system according to the fourth embodiment is different from the information processing system according to the second embodiment in that a part of the user terminal is connected to an external telephone network. Therefore, the following will primarily describe such a difference.

(Configuration)

Figure 16:
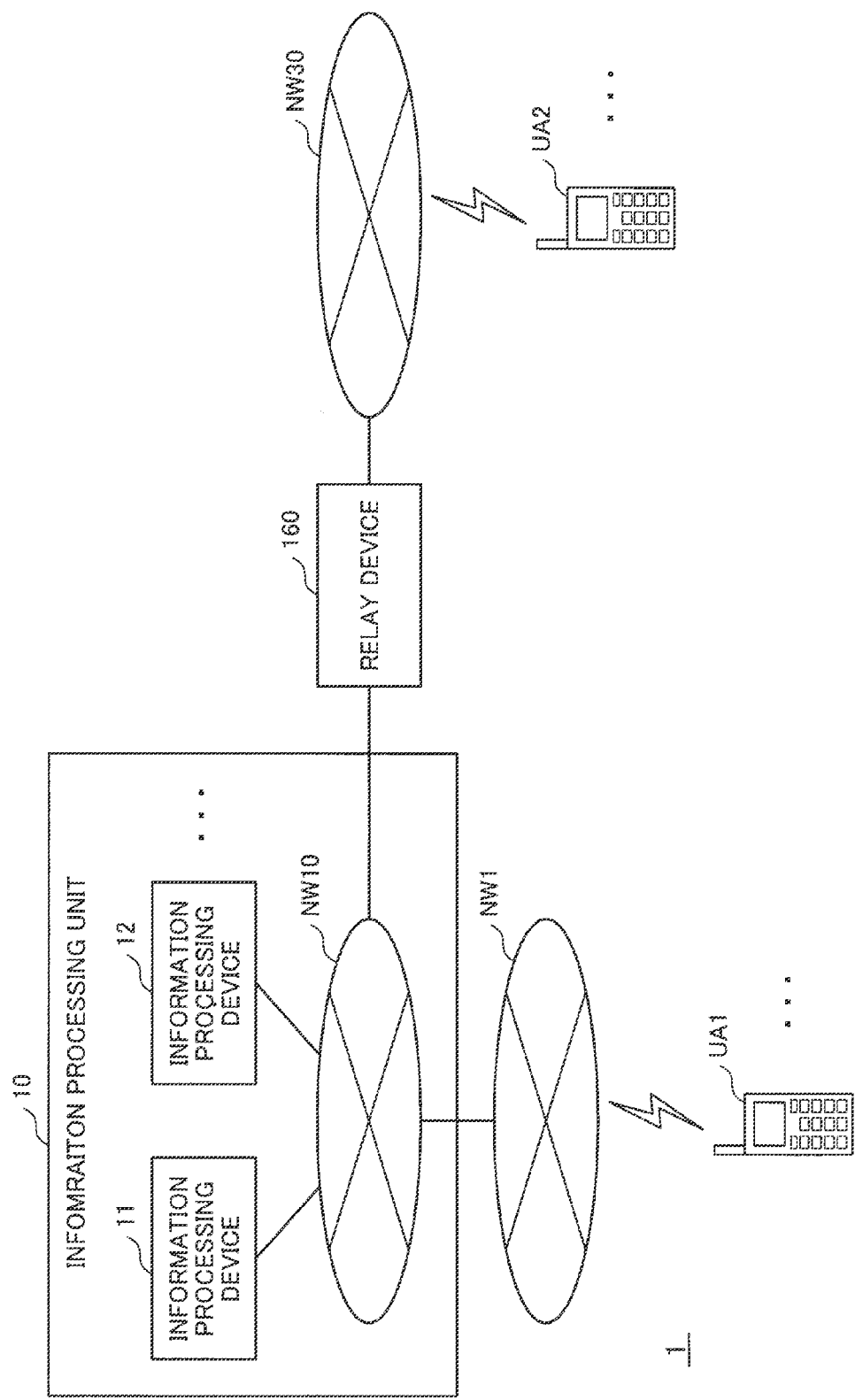
FIG. 16 is a diagram depicting a configuration of an information processing system according to a fourth embodiment of the present invention.

As depicted in FIG. 16, the information processing system 1 of the fourth embodiment contains: an information processing unit 10 and a plurality of user terminals UA1, UA2, . . . .

The information processing unit 10 contains a plurality of information processing devices 11, 12, . . . (e.g., mobile telephone terminals). The plurality of information processing devices 11, 12, . . . are communicably connected via an in-unit communication network NW10. Further, the first user terminal UA1 is connected to the first in-unit communication network NW10 via a first user-side communication network NW1.

The second user terminal UA2 is connected to an external telephone network (e.g., a public switch telephone network, or a mobile communication network) NW30. The external telephone network NW30 is connected to the in-unit communication network NW10 via a relay device 160.

For example, the user-side communication network NW1 is a communication network used inside a company or other organizations. Therefore, a telephone call between users of the user terminals UA1, . . . that are connected to the user-side communication network NW1 is equivalent to a telephone call using an internal line. Whereas, a telephone call between users of the user terminals UA2, . . . that are connected to the external telephone network NW30 is equivalent to a telephone call using an outside line.

The relay device 160 is located at the boundary between the in-unit communication network NW10 and the external telephone network NW30 and relays between the IP communication network and the telephone network. The relay device 160 restores information received from the in-unit communication network NW10 to an analog voice signal and transmits the analog voice signal to the external telephone network NW30. Further, the relay device 160 converts the analog voice signal that is input from the external telephone network NW30 to digital data and transmits the digital data to the in-unit communication network NW10. The relay device 160 is configured, for example, by a Voice over Internet Protocol (VoIP) gateway or the like.

The administrator function section 110 receives an outgoing call notification that includes a telephone number of an incoming call destination (user terminal UA2) and is transmitted from the user terminal UA1. Then, the administrator function section 110 transmits the telephone number to the stateful proxy function section 120.

The stateful proxy function section 120 receives the telephone number transmitted from the administrator function section 110. Then, the stateful proxy function section 120 transmits the received telephone number to the DNS function section 130.

The DNS function section 130 acquires the IP address (communication destination IP address) of the relay device 160 that is prestored in association with the received telephone number, and transmits the IP address to the stateful proxy function section 120.

The stateful proxy function section 120 receives the communication destination IP address transmitted from the DNS function section 130. Then, based on the received communication destination IP address, the stateful proxy function section 120 transmits a connection request that includes the telephone number to the relay device 160.

The relay device 160 notifies the communication destination user terminal of the incoming call based on the telephone number included in the received connection request. Then, when receiving a response to the incoming call from the communication destination user terminal, the relay device 160 notifies the stateful proxy function section 120 of the positive response.

When receiving the positive response notification from the relay device 160, the stateful proxy function section 120 establishes a session between the communication destination IP address that is the IP address allocated to the relay device 160 and the communication source IP address that is the IP address allocated to the communication source user terminal. Further, the stateful proxy function section 120 transmits the communication destination IP address to the communication source user terminal.

As such, a speech communication (communication processing) can be secured between the first user terminal UA1 that is connected to the user-side communication network NW1 and the second user terminal UA2 that is connected to the external telephone network NW30.

Further, when receiving a connection request that includes a telephone number allocated to a communication destination user terminal from the external telephone network NW30 to which the communication source user terminal is connected, the administrator function section 110 outputs the telephone number to the stateful proxy function section 120.

In addition, the stateful proxy function section 120 establishes a session between the communication destination IP address that is the IP address output from the DNS function section 130 and the communication source IP address that is the IP address allocated to the communication source user terminal, by cooperating with the external telephone network NW30. Further, the stateful proxy function section 120 transmits the incoming call destination IP address to the communication source user terminal by cooperating with the external telephone network NW30.

As such, a speech communication can be secured between the first user terminal UA1 that is connected to the user-side communication network NW1 and the second user terminal UA2 that is connected to the external telephone network NW30.

(Operation)

Next, the operation of the above-described information processing system 1 will be described. First, described will be a case in which the first user terminal UA1 transmits an outgoing call notification (a connection request notification) that includes a telephone number (identification information) allocated to the second user terminal UA2.

In such a case, the administrator function section 110 transmits, to the stateful proxy function section 120, the telephone number included in the outgoing call notification transmitted from the first user terminal UA1. The stateful proxy function section 120 transmits the received telephone number to the DNS function section 130.

As such, the DNS function section 130 receives the telephone number. Then, the DNS function section 130 acquires the IP address (communication destination IP address) of the relay device 160 that is stored in association with the identification information, and transmits the IP address to the stateful proxy function section 120. Based on the received communication destination IP address, the stateful proxy function section 120 transmits a connection request that includes the telephone number to the relay device 160.

Then, the relay device 160 notifies the second user terminal UA2 of the incoming call based on the telephone number included in the received connection request. As such, the stateful proxy function section 120 establishes a session between the communication destination IP address (relay device 160) and the communication source IP address (the first user terminal UA1). Further, the stateful proxy function section 120 transmits the communication destination IP address to the outgoing call source user terminal UA1 by cooperating with the external telephone network NW30.

As such, the first user terminal UA1 receives the communication destination IP address. Then, the first user terminal UA1 carries out a speech communication, via the relay device 160 to which the communication destination IP address is allocated, with the second user terminal UA2 via a session established in accordance with a predefined method (e.g., Real-time Transport Protocol (RTP)).

As such, the user of the first user terminal UA1 and the user of the second user terminal UA2 can make a telephone conversation.

Next, described will be a case in which the second user terminal UA2 transmits an outgoing call notification that includes the telephone number allocated to the first user terminal UA1.

In such a case, the relay device 160 receives a connection request that includes a telephone number allocated to the communication destination user terminal UA1 via the external telephone network NW30 to which the communication source user terminal UA2 is connected. Then, the relay device 160 acquires the IP address of the communication destination user terminal UA1 that is prestored in association with the telephone number included in the received connection request, and transmits the IP address to the administrator function section 110. Note that the relay device 160 acquires the IP address of the communication destination user terminal UA1, for example, from the DNS device that is preinstalled inside or outside the relay device 160.

As such, the administrator function section 110 receives the IP address that is associated with the telephone number. Then, the administrator function section 110 outputs the received IP address to the stateful proxy function section 120.

As such, the stateful proxy function section 120 establishes a session between the output communication destination IP address (the first user terminal UA1) and the communication source IP address (the relay device 160).

As such, the second user terminal UA2 performs a speech communication, via the relay device 160, with the first user terminal UA1 to which the communication destination IP address is allocated via the session established in accordance with a predefined method (e.g., RTP).

As such, the user of the first user terminal UA1 and the user of the second user terminal UA2 can make a telephone conversation.

As described above, the information processing system 1 according to the fourth embodiment of the present invention can also provide the same influences and effects as the information processing system 1 according to the second embodiment. Further, according to the information processing system 1 of the fourth embodiment, a speech communication can be secured between the first user terminal UA1 that is connected to the user-side communication network NW1 and the second user terminal UA2 that is connected to the external telephone network NW30.

Fifth Exemplary Embodiment

Next, the information processing system according to the fifth embodiment of the present invention will be described. The information processing system according to the fifth embodiment is an information processing system formed by combining the information processing system according to the above-described first embodiment and the information processing system according to the second embodiment. Therefore, the difference from the above-described first embodiment and the second embodiment will be mainly described.

(Configuration)

Figure 17:
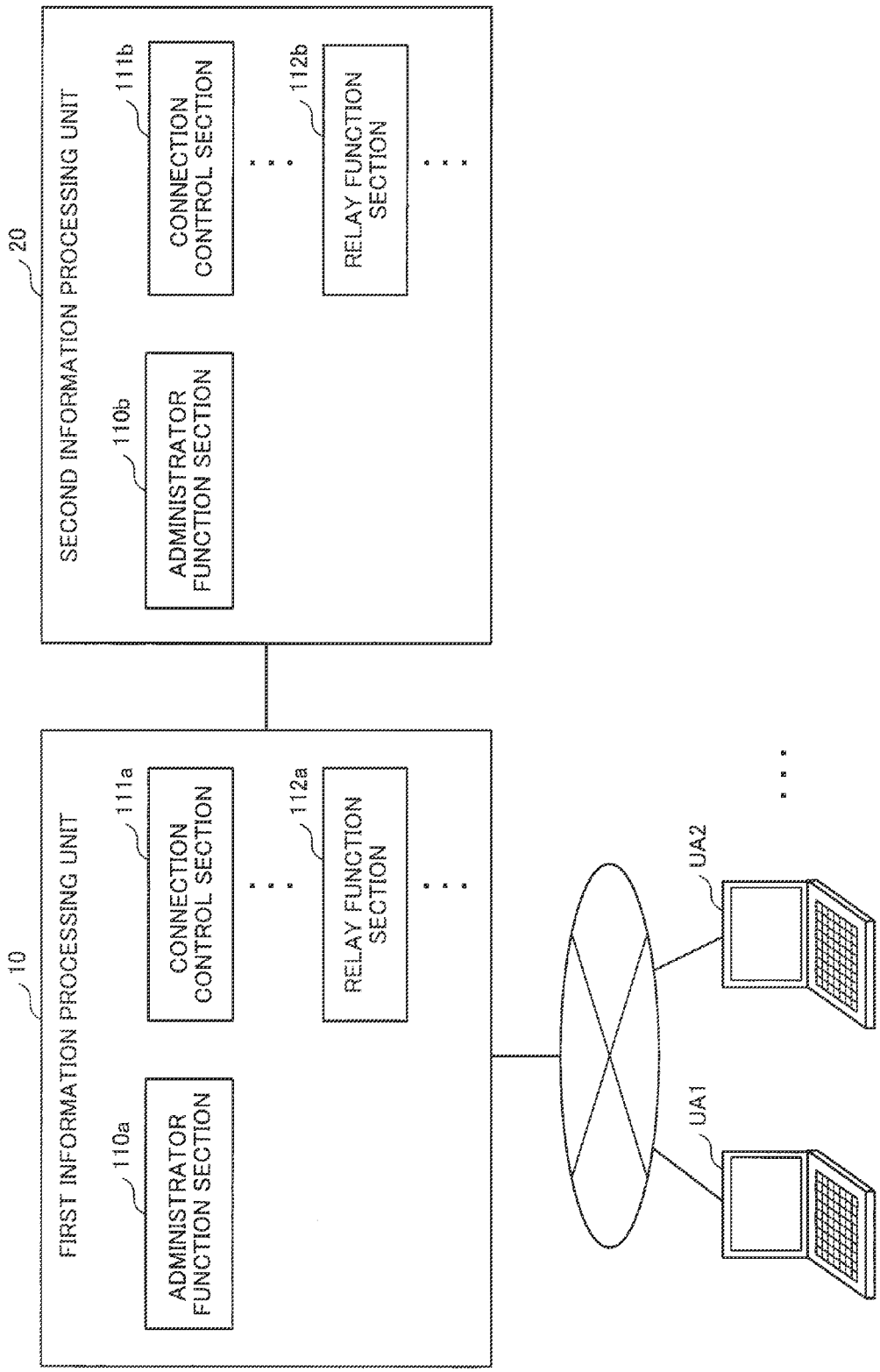
FIG. 17 is a diagram depicting a configuration of an information processing system according to a fifth embodiment of the present invention.

As depicted in FIG. 17, an information processing system 1 according to the fifth embodiment contains a plurality of information processing units that include a first information processing unit 10 and a second information processing unit 20. Note that the information processing system 1 may contain three or more information processing units. Further, the internal configuration of the first information processing unit 10 and the second information processing unit 20 is the same as the configuration of the information processing unit of the second embodiment.

The administrator function section 110 respectively acquires the operating state of the information processing unit 10 (the connection control section 111 and the relay function section 112), and generates an information processing unit 10 (a connection control section 111 and a relay function section 112) in accordance with the acquired operating state. Note that the administrator function section 110 may generate the connection control section 111, the relay function section 112, the stateful proxy function section 120, and the DNS function section 130 separately. Further, according to the acquired operating state, the administrator function section 110 instructs another information processing unit (e.g., the second information processing unit 20) to perform the communication processing among the user terminals UA1, UA2, . . . . The administrator function section 110 is configured, when there are a plurality of information processing units, to instruct the information processing unit with the smallest load to perform the communication processing. The following will specifically describe the details.

For example, when the load indicated by the acquired load information is larger than a predefined first load threshold (the first operating state), the administrator function section 110 newly generates the connection control section 111. Further, when the load indicated by the acquired load information is larger than a predefined second load threshold (the first load threshold<the second load threshold) (the second operating state), the administrator function section 110 instructs the connection control section 111 included in another information processing unit to control connections among the user terminals UA1, UA2, . . . . That is, when acquiring information that indicates the preset first operating state as the operating state, the administrator function section 110 newly generates a connection control section 111, while, when acquiring information that indicates the preset second operating state, the administrator function section 110 instructs another information processing unit to control connections among the plurality of user terminals. As such, occurrence of congestion can be securely avoided. Further, excessive generation of the connection control sections 111 can be prevented.

Further, the administrator function section 110 detects occurrence of a fault in the connection control section 111 (acquires whether a fault has occurred). When occurrence of a fault is detected in the connection control section 111, the administrator function section 110 instructs another information processing unit to control connections among the plurality of user terminals. Further, when occurrence of a fault is detected in the connection control section 111, the administrator function section 110 newly generates a connection control section 111. Then, the administrator function section 110 can change the processing according to the degree of the fault. For example, if the fault that occurred in relation to the connection control section 111 is a fault that is correctable within preset time (when acquiring information indicating the first operating state), the administrator function section 110 may newly generate a connection control section 111. If the fault that occurred in relation to the connection control section 111 is a fault that is uncorrectable within preset time (when acquiring information indicating the second operating state), the administrator function section 110 may instruct another information processing unit to instruct control connections among the plurality of user terminals. As such, connections among the user terminals UA1, UA2, . . . can be secured.

Likewise, the administrator function section 110 acquires load information that indicates the load of the relay function section 112. When the load indicated by the acquired load information is larger than a predefined third load threshold (the third operating state), the administrator function section 110 newly generates a relay function section 112. Further, when the load indicated by the acquired load information is larger than a predefined fourth load threshold (the third load threshold<the fourth load threshold) (the fourth operating state), the administrator function section 110 instructs the relay function section 112 included in another information processing unit to relay connections among the user terminals UA1, UA2, . . . . That is, when acquiring information that indicates the preset first operating state as the operating state, the administrator function section 110 newly generates a relay function section 112, while, when acquiring information that indicates the preset second operating state, the administrator function section 110 instructs another information processing unit to relay communications among the plurality of user terminals. As such, occurrence of congestion can be securely avoided. Further, excessive generation of the relay function sections 112 can be prevented.

Further, the administrator function section 110 detects occurrence of a fault in the relay function section 112. When occurrence of a fault is detected in the relay function section 112, the administrator function section 110 instructs another information processing unit to relay communications among the plurality of user terminals. Further, when occurrence of a fault is detected in the relay function section 112, the administrator function section 110 newly generates a relay function section 112. Then, the administrator function section 110 can change the processing according to the degree of the fault. For example, if the fault that occurred in relation to the relay function section 112 is a fault that is correctable within preset time (when acquiring information indicating the first operating state), the administrator function section 110 may newly generate a relay function section 112. If the fault that occurred in relation to the relay function section 112 is a fault that is uncorrectable within preset time (when acquiring information indicating the second operating state), the administrator function section 110 may instruct another information processing unit to relay communications among the plurality of user terminals. As such, communications among the user terminals UA1, UA2, . . . can be secured.

(Operation)

Next, the operation of the above-described information processing system 1 will be described. Note that the operation of the information processing system 1 of the fifth embodiment is the same as the one of the first embodiment, thus, the operation will be described with reference to FIG. 4. First, as depicted in FIG. 4, the first user terminal UA1 transmits a connection request notification that includes the identification information for identifying the second user terminal UA2 to the administrator function section 110 (step S101).

As such, the administrator function section 110 receives the connection request notification. Then, the administrator function section 110 performs the operating state determination processing for the connection control section 111 (step S102). An example of the operating state determination processing will be described with reference to FIG. 18. Note that the administrator function section 110 may perform either the processing of FIG. 18 or the processing of FIG. 19 as will be described later herein, as the operating state determination processing. Further, the administrator function section 110 may perform the processing of both FIGS. 18 and 19, as the operating state determination processing.

Figure 18:
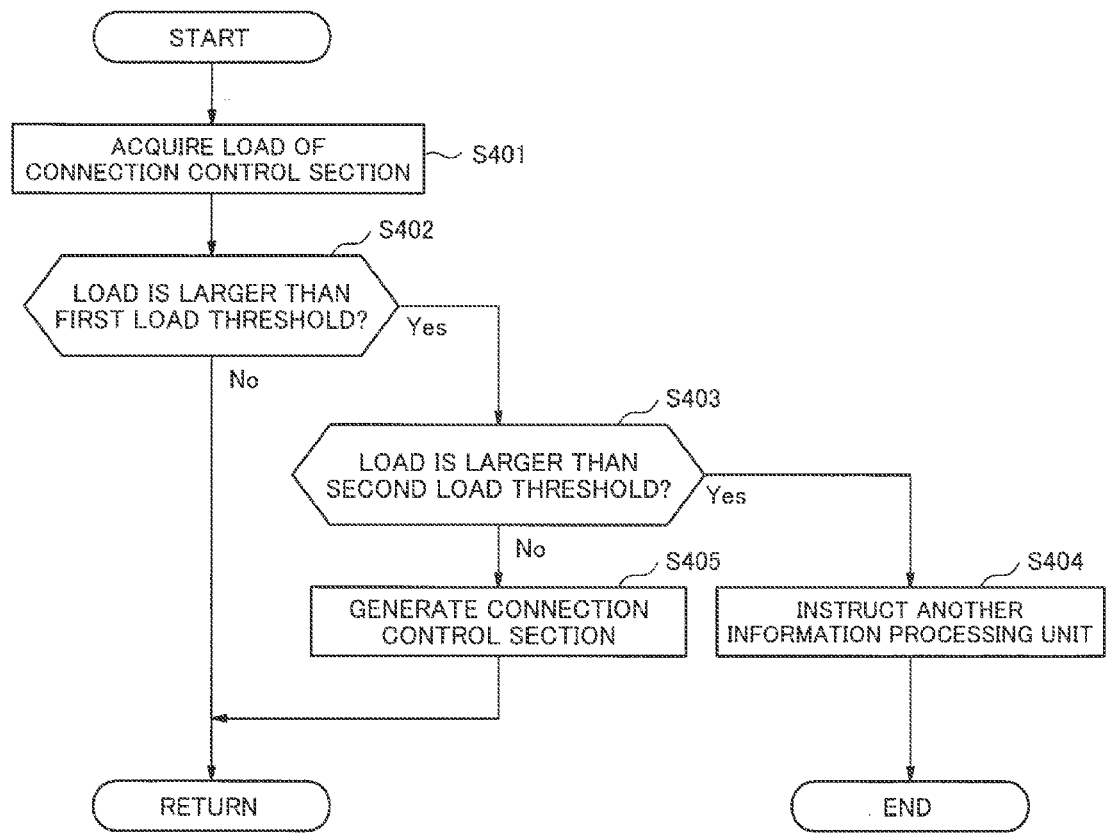
FIG. 18 is a flowchart depicting processing that an administrator function section performs according to the fifth embodiment of the present invention.

FIG. 18 is a flowchart illustrating the processing of determining the degree of a load in stages. First, the administrator function section 110 acquires the load of the connection control section 111 (step S401). Subsequently, the administrator function section 110 determines whether or not the acquired load is larger than a first load threshold (step S402).

When the load is determined as larger than the first load threshold (step S402: Yes), the administrator function section 110 determines whether or not the acquired load is larger than a second load threshold (the first load threshold<the second load threshold) (step S403). When the load is determined as larger than the second load threshold (step S403: Yes), the administrator function section 110 instructs the connection control section 111 of another information processing unit to control connections among the plurality of user terminals (step S404). The processing terminates after the processing of step S404.

Whereas, when the load is determined as smaller than the second load threshold (step S403: No), the administrator function section 110 newly generates a connection control section 111 (step S405). After the processing of step S405, or, when the load is determined as smaller than the first load threshold (step S402: No), the processing proceeds to step S103 of FIG. 4.

As such, when the degree of the load is larger than the first load threshold, as well as, smaller than the second load threshold, the administrator function section 110 newly generates a connection control section 111, while, when the degree of the load is larger than the second load threshold, the administrator function section 110 instructs another information processing unit to control connections among the user terminals. Therefore, congestion in the information processing unit can be decreased, as well as, predetermined information can be securely communicated between the user terminals.

Then, referring back to FIG. 4, the identification information included in the connection request notification is transmitted to the stateful proxy function section 120 (step S103). As such, the stateful proxy function section 120 receives the identification information. Then, the stateful proxy function section 120 transmits the identification information to the DNS function section 130 (step S104).

As such, the DNS function section 130 receives the identification information. Then, the DNS function section 130 acquires the IP address stored in association with the identification information as the communication destination IP address. Next, the DNS function section 130 transmits the communication destination IP address to the stateful proxy function section 120 (step S105).

As such, the stateful proxy function section 120 receives the communication destination IP address. Then, the stateful proxy function section 120 transmits the communication destination IP address to the first user terminal UA1 (step S106). As such, the user terminal UA1 receives the communication destination IP address.

Next, as depicted in FIG. 6, the first user terminal UA1 transmits a server connection request that includes the received communication destination IP address to the administrator function section 110 (step S121). As such, the administrator function section 110 receives the server connection request. Then, the administrator function section 110 performs the operating state determination processing for the relay function section 112 (step S122). That is, the administrator function section 110 performs the same processing as the processing depicted in FIG. 18 for the relay function section 112.

As the result of the operating state determination processing of step S122, when the load of the relay function section 112 is a preset threshold or smaller, and no fault has occurred in the relay function section 112, the administrator function section 110 transmits the communication destination IP address included in the server connection request and the IP address (communication source IP address) of the first user terminal UA1 (communication source user terminal) to the relay function section 112 (step S123).

As such, the relay function section 112 receives the IP addresses (the communication destination IP address and the communication source IP address). Then, the relay function section 112 connects with the user terminal based on the received IP addresses (step S124).

Figure 19:
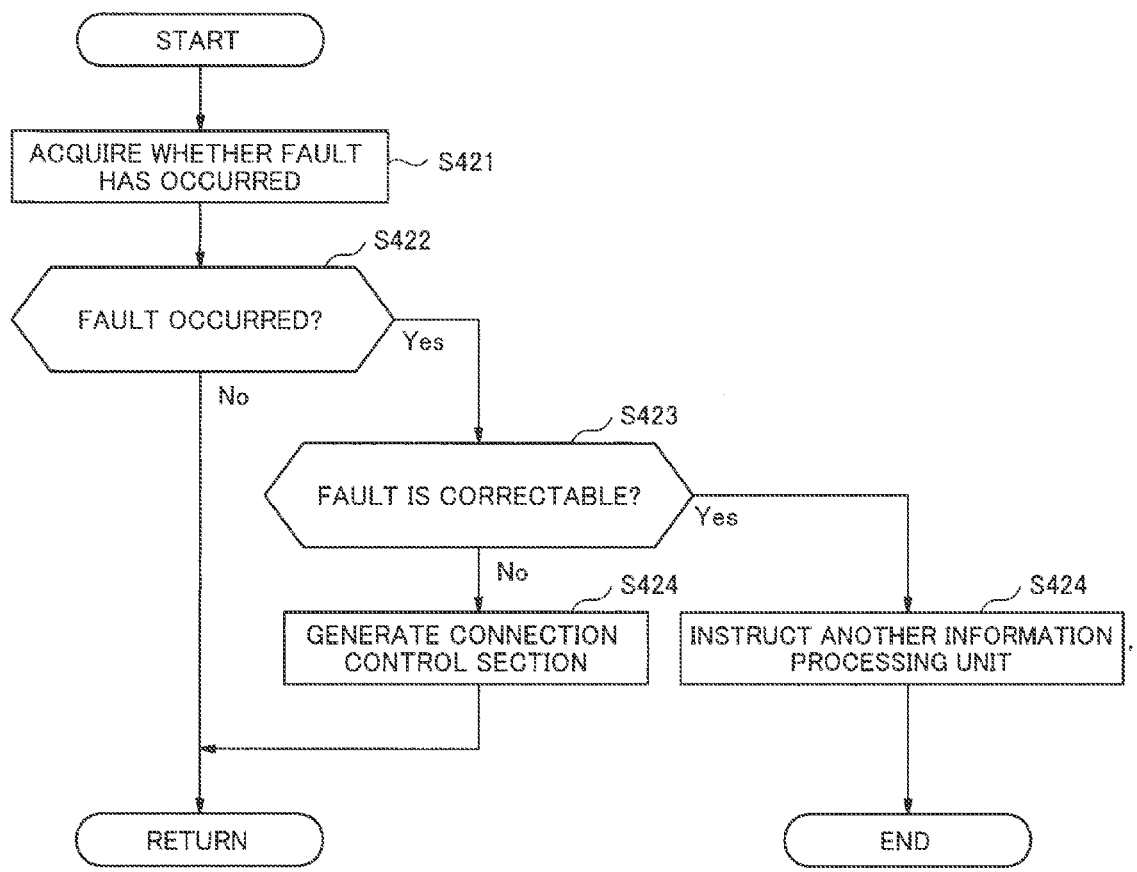
FIG. 19 is a flowchart depicting processing that the administrator function section performs according to the fifth embodiment of the present invention.

Note that the degree of a fault can be determined in stages as the operating state of the information processing unit, then, the processing according to the determined operating state can be performed. FIG. 19 is a flowchart illustrating the processing of determining the degree of a fault in stages.

As depicted in FIG. 19, the administrator function section 110 acquires occurrence of a fault in the connection control section 111 (step S421). Subsequently, the administrator function section 110 determines whether or not a fault has occurred (step S422).

When occurrence of a fault is determined (step S422: Yes), the administrator function section 110 determines whether or not the fault is correctable within preset time (step S423). Whether or not the generated fault is correctable within the preset time can be determined, for example, by prestoring fault-identification information (e.g., an error code) and correction time thereof. Note that, when determining that a fault has occurred, the administrator function section 110 acquires the fault-identification information.

When the fault is determined as uncorrectable (step S423: No), the administrator function section 110 instructs the connection control section 111 of another information processing unit to control connections among the plurality of user terminals (step S424). The processing terminates after the processing of step S424.

On the other hand, when the fault is determined as correctable (step S423: Yes), the administrator function section 110 newly generates a connection control section 111 (step S425). After the processing of step S425, or when non-occurrence of a fault is determined (step S422: No), the processing proceeds to step S103 of FIG. 4.

In this way, a new connection control section 111 is generated when a minor fault has occurred, while another information processing unit is instructed to control connections among user terminals when a major fault has occurred. Therefore, predetermined information can be securely communicated among the user terminals. Note that, in the above example of fifth embodiment, whether or not the fault is correctable within certain time is determined, without restriction thereto, to determine either instructing another information processing unit or generating a new connection control section 111.

Note that, in the same way as the processing of FIG. 18, the administrator function section 110 performs the same processing as the processing depicted in FIG. 19 for the relay function section 112.

Sixth Exemplary Embodiment

Figure 20:
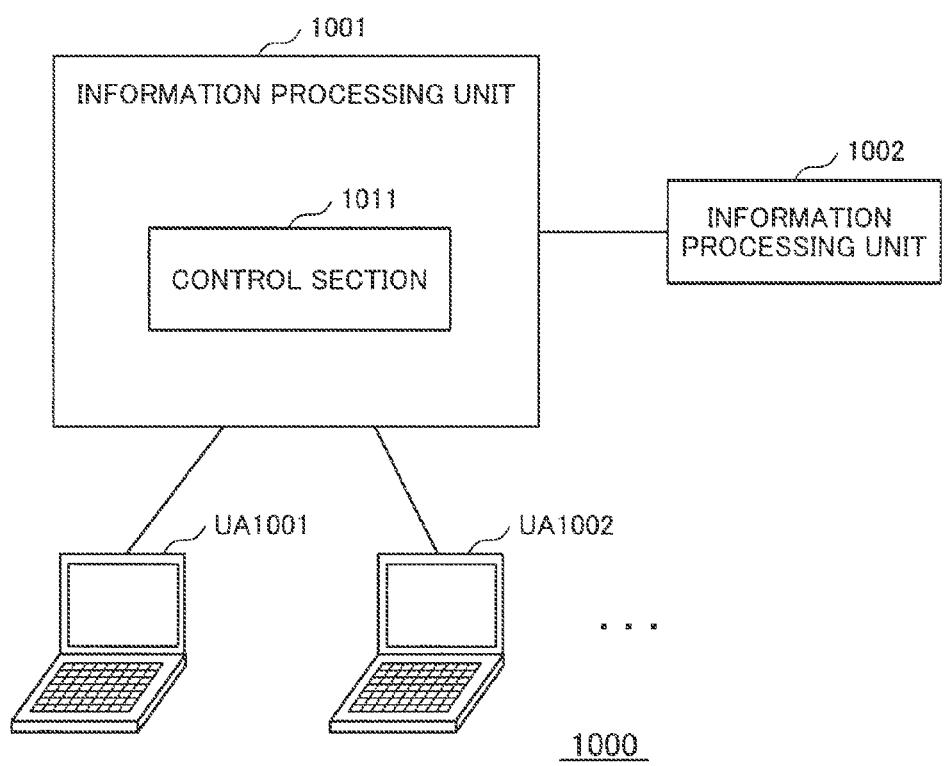
FIG. 20 is a block diagram depicting functions of an information processing system according to a sixth embodiment of the present invention.

Next, the information processing system according to the sixth embodiment of the present invention will be described with reference to FIG. 20. The information processing system 1000 according to the sixth embodiment is a system that contains an information processing unit that performs communication processing among a plurality of user terminals UA1001, UA1002, . . . that are connected via the IP (Internet Protocol) network.

The information processing unit 1001 contains a control section 1011 that acquires the operating state of the information processing unit 1001, as well as, instructs another information processing unit 1002 to perform the communication processing among a plurality of user terminals UA1001, UA1002, . . . according to the acquired operating state.

As such, according to the operating state of the information processing unit 1001, the information processing unit 1001 instructs another information processing unit 1002 to perform communication processing among the plurality of user terminals UA1001, UA1002, . . . , and, thus, the information processing unit to perform the communication processing is switched, whereby the plurality of user terminals can securely communicate predetermined information.

In this way, for example, even when the information processing unit 1001 is connected to a plurality of user terminals thereby causing congestion, the information processing system 1000 can enable the user terminals to securely communicate predetermined information.

The present invention has been described so far with reference to the above-described embodiments, without limitation thereto. A variety of modifications, which will be understood by those skilled in the art, can be made to the configuration and details of the invention of the present application within the scope thereof.

For example, while, in the information processing system according to the above-described embodiments, one virtual machine configures one functional section, one virtual machine may configure a plurality of functional sections. Further, while, in the information processing system according to the above-described embodiments, one virtual machine configures one functional section, a plurality of virtual machines may cooperate one functional section.

Further, the information processing system according to the above-described embodiments may be provided in a data center in which are installed devices that perform a variety of computer and data communications, providing a predetermined service. As such, the data center provider can operate a more secure communication business.

Note that each function of the information processing system in the above-described embodiments is implemented by executing a program (software) with the CPU, while the function may be implemented by hardware, such as circuits.

Further, while the program is stored in a storage device in the above embodiments, the program may be stored in a computer-readable recording medium. For example, the recording medium is a portable medium, such as a flexible disc, an optical disc, a magneto-optical disc, and a semiconductor memory.

Further, as another variation of the above-described embodiments, an arbitrary combination of the above-described embodiments and variations may be employed.

<Supplementary Notes>

Part or whole of the above-described embodiments can be described as the following Supplementary Notes, without limitation.

(Supplementary Note 1)

An information processing system including an information processing unit that performs communication processing among a plurality of user terminals connected via an IP (Internet Protocol) network, the information processing unit including:

control means for acquiring an operating state of the information processing unit, and instructs another information processing unit to perform the communication processing among the plurality of user terminals, according to the acquired operating state.

According to Supplementary Note 1, even when congestion or a fault occurs in the information processing unit, communication processing among a plurality of user terminals can be secured.

(Supplementary Note 2)

In the information processing system according to Supplementary Note 1, the control means acquires a load as the operating state of the information processing unit, and, when the acquired load is larger than a preset load threshold, the control means instructs another information processing unit to perform the communication processing among the plurality of user terminals.

According to Supplementary Note 2, even when the load of the information processing unit is large, thereby possibly causing congestion, the communication processing among a plurality of user terminals can be performed while securely avoiding congestion.

(Supplementary Note 3)

In the information processing system according to either Supplementary Note 1 or 2, wherein the control means acquires whether a fault has occurred in the information processing unit as the operating state of the information processing unit, and, when there is a fault, the control unit instructs another information processing unit to perform the communication processing among the plurality of user terminals.

According to Supplementary Note 3, even when a fault occurs within the information processing unit, disabling of the communication processing among user terminals can be securely avoided.

(Supplementary Note 4)

The information processing system according to any one of Supplementary Notes 1 to 3, wherein the information processing unit includes connection control means for controlling a connection among the plurality of user terminals, and the control means acquires an operating state of the connection control means, and instructs a connection control means included in the another information processing unit to control the connection among the plurality of user terminals according to the acquired operating state.

According to Supplementary Note 4, even when receiving connection requests from many user terminals, each of the plurality of user terminals can be securely connected.

(Supplementary Note 5)

The information processing system according to Supplementary Note 4, wherein, when acquiring information that indicates a first operating state preset as the operating state of the connection control means, the control means newly generates a connection control means.

According to Supplementary Note 5, even when congestion or a fault occurs in the connection control means, the connections among a plurality of user terminals can be securely controlled. Further, excessive generation of the connection control means can be prevented.

(Supplementary Note 6)

The information processing system according to any one of Supplementary Notes 1 to 5, wherein the information processing unit includes relay function means for relaying communications among the plurality of user terminals, and the control means acquires an operating state of the relay function means, and instructs a relay function means included in the another information processing unit to relay the communications among the plurality of user terminals according to the acquired operating state.

According to Supplementary Note 6, even when communications of many user terminals are relayed, each of the communications of the plurality of user terminals can be securely relayed.

(Supplementary Note 7)

The information processing system according to Supplementary Note 6, wherein when acquiring information that indicates a second operating state preset as the operating state of the relay function means, the control means newly generates a relay function means.

According to Supplementary Note 7, even when congestion or a fault occurs in a relay function means, communications among a plurality of user terminals can be securely relayed. Further, excessive generation of the relay function means can be prevented.

(Supplementary Note 8)

An information processing system including an information processing unit that performs communication processing among a plurality of user terminals connected via an IP (Internet Protocol) network, the information processing unit including:

service providing means for providing a preset service to a plurality of user terminals; and control means for acquiring an operating state of the service providing means, and generates a new service providing means according to the acquired operating state.

According to Supplementary Note 8, even when congestion or a fault occurs in the information processing unit, communication processing among a plurality of user terminals can be secured.

(Supplementary Note 9)

The information processing system according to Supplementary Note 8, wherein the information processing unit includes a plurality of control means including a first control means and a second control means, the first control means acquires a whole operating state that indicates an operating state of the entire service providing means that the first control means controls, and, according to the acquired whole operating state, outputs a generation request for requesting generation of the service providing means to the second control means, and when the generation request is output by the first control means, the second control means newly generates the requested service providing means.

According to Supplementary Note 9, occurrence of congestion or a fault can be securely avoided. Further, excessive generation of the service providing means can be prevented.

(Supplementary Note 10)

The information processing system according to either Supplementary Note 8 or 9, wherein the service providing means includes connection control means for controlling the connection among the plurality of user terminals, and the control means acquires an operating state of the connection control means, and generates a new connection control means according to the acquired operating state.

According to Supplementary Note 10, connections among a plurality of user terminals can be securely controlled. Further, excessive generation of the connection control means can be prevented.

(Supplementary Note 11)

The information processing system according to Supplementary Note 10, wherein the connection control means includes: stateful proxy function means; and DNS (Domain Name System) function means for storing identification information for specifying a communication destination and an IP address allocated to the identification information, in association with each other, the control means receives a connection request notification that includes the identification information from a communication source user terminal that is a user terminal as a communication source, and outputs the identification information included in the received connection request notification to the stateful proxy function means, the stateful proxy function means outputs the identification information that is output from the control means to the DNS function means, the DNS function means outputs an IP address stored in association with the identification information that is output from the stateful proxy function means to the stateful proxy function means, and the stateful proxy function means transmits a communication destination IP address that is the IP address output from the DNS function means to the communication source user terminal.

According to Supplementary Note 11, for example, even when connection request notifications are transmitted from many user terminals, the information processing system can securely control connections among a plurality of user terminals.

(Supplementary Note 12)

The information processing system according to Supplementary Note 11, wherein the control means acquires stateful proxy load information that indicates a load of the stateful proxy function means as the operating state of the connection control means, and, when the load indicated by the acquired stateful proxy load information is larger than a preset threshold load, the control means newly generates the stateful proxy function means.

According to Supplementary Note 12, even when the load of the stateful proxy function means is high, congestion can be securely avoided. Further, excessive generation of the stateful proxy function means can be prevented.

(Supplementary Note 13)

The information processing system according to either Supplementary Note 11 or 12, wherein the control means detects occurrence of a fault in the stateful proxy function means as the operating state of the connection control means, and, when occurrence of the fault is detected, the control means newly generates the stateful proxy function means.

According to Supplementary Note 13, when a fault occurs in the stateful proxy function means, connections among a plurality of user terminals can be securely controlled. Further, excessive generation of the stateful proxy function means can be prevented.

(Supplementary Note 14)

The information processing system according to any one of Supplementary Notes 11 to 13, wherein the control means acquires DNS load information that indicates a load of the DNS function means as the operating state of the connection control means, and, when the load indicated by the acquired DNS load information is larger than a preset threshold load, the control means newly generates the DNS function means.

According to Supplementary Note 14, even when the load of the DNS function means is high, congestion can be securely avoided. Further, excessive generation of the DNS function means can be prevented.

(Supplementary Note 15)

The information processing system according to any one of Supplementary Notes 11 to 14, wherein the information processing unit includes unit specifying means for storing identification information for identifying a user terminal and unit specific information for specifying the information processing unit to which the user terminal is connected, in association with each other, when an IP address allocated to the identification information included in the connection request notification is not output from the DNS function means, the stateful proxy function means outputs the identification information to the unit specifying means, the unit specifying means outputs the unit specific information stored in association with the identification information output from the stateful proxy function means to the stateful proxy function means, the stateful proxy function means transmits a connection request including the identification information included in the connection request notification to a control means that is provided in another information processing unit specified by the unit specific information output from the unit specifying means, when receiving the connection request from the information processing unit, the control means provided in the another information processing unit outputs the identification information included in the connection request to the stateful proxy function means provided in the other information processing unit, and the stateful proxy function means provided in the another information processing unit transmits a communication destination IP address that is an IP address output from the DNS function means provided in the another information processing unit to the communication source user terminal.

According to Supplementary Note 15, connections among user terminals that are respectively connected to a plurality of information processing units can be securely controlled.

(Supplementary Note 16)

The information processing system according to any one of Supplementary Notes 11 to 14, wherein the control means determines whether or not a communication destination user terminal is connected to an external telephone network, when the communication destination user terminal is determined as being connected to the external telephone network, the stateful proxy function means transmits a connection request that includes a telephone number as the identification information included in the connection request notification to the external telephone network, and the stateful proxy function means establishes a session between the communication destination IP address and a communication source IP address that is an IP address of the communication source user terminal, and transmits the communication destination IP address to the communication source user terminal, by cooperating with the external telephone network.

According to Supplementary Note 16, a speech communication can be securely performed with a user terminal that is connected to an external telephone network.

(Supplementary Note 17)

The information processing system according to any one of Supplementary Notes 11 to 16, wherein when receiving the connection request notification that includes a telephone number as the identification information allocated to the communication destination user terminal from the external telephone network to which, the communication source user terminal is connected, the control means outputs the telephone number to the stateful proxy function means, and the stateful proxy function means establishes a session between the communication destination IP address output from the DNS function means and a communication source IP address that is an IP address of the communication source user terminal, and transmits the communication destination IP address to the communication source user terminal by cooperating with the external telephone network.

According to Supplementary Note 17, a speech communication can be securely performed with a user terminal that is connected to an external telephone network.

(Supplementary Note 18)

The information processing system according to any one of Supplementary Notes 8 to 17, wherein the service providing means includes relay function means for relaying a communication among the plurality of user terminals, and the control means acquires an operating state of the relay function means, and generates a new relay function means according to the acquired operating state.

According to Supplementary Note 18, communications among a plurality of user terminals can be securely relayed. Further, excessive generation of the relay function means can be prevented.

(Supplementary Note 19)

An information processing method applied to an information processing system that includes an information processing unit performing communication processing among a plurality of user terminals connected via an IP (Internet Protocol) network, the method including:

acquiring an operating state of the information processing unit, and instructing another information processing unit to perform the communication processing among the plurality of user terminals, according to the acquired operating state.

(Supplementary Note 20)

A program for controlling an information processing system that includes an information processing unit performing communication processing among a plurality of user terminals connected via an IP (Internet Protocol) network, the program causing the information processing unit to implement control means that acquires an operating state of the information processing unit, and instructs another information processing unit to perform communication processing among the plurality of user terminals, according to the acquired operating state.

(Supplementary Note 21)

An information processing device that performs communication processing among a plurality of user terminals connected via an IP (Internet Protocol) network, including:

control means that acquires an operating state of the information processing device, and instructs another information processing device to perform the communication processing among the plurality of user terminals, according to the acquired operating state.

(Supplementary Note 22)

An information processing method applied to an information processing system that includes an information processing unit performing communication processing among a plurality of user terminals connected via an IP (Internet Protocol) network, the information processing unit including service providing means for providing a preset service to a plurality of user terminals, the information processing method comprising acquiring an operating state of the service providing means, and generates a new service providing means according to the acquired operating state.

(Supplementary Note 23)

A program for controlling an information processing system that includes an information processing unit performing communication processing among a plurality of user terminals connected via an IP (Internet Protocol) network, the program causing the information processing unit to implement:

service providing means that provides a preset service to a plurality of user terminals; and control means that acquires an operating state of the service providing means, and generates a new service providing means according to the acquired operating state.

(Supplementary Note 24)

An information processing device that performs communication processing among a plurality of user terminals connected via an IP (Internet Protocol) network, including;

service providing means for providing a preset service to the plurality of user terminals; and control means for acquiring an operating state of the service providing means, and generates a new service providing means according to the acquired operating state.

Note that the program described in the above-described embodiments and supplementary notes is stored in a storage device or a computer-readable recording medium. The recording medium is, for example, a portable medium, such as a flexible disc, an optical disc, a magneto-optical disc, or a semiconductor memory.

The present invention has been described so far with reference to the above-described embodiments, without limitation thereto. A variety of modifications that will be understood by those skilled in the art can be made to the configurations and details of the invention of the present application within the scope thereof.

Note that the present invention shall benefit from the priority right claimed in the patent application of Japanese Patent Application No. 2012-079717 filed on Mar. 30, 2012 in Japan and Japanese Patent Application No. 2012-182633 filed on Aug. 21, 2012 in Japan, and ail the contents described in the patent applications shall be included herein.

INDUSTRIAL APPLICABILITY

The present invention is applicable, for example, to an information processing system for providing services to user terminals that are connected to one another via an IP network, and an information processing system for providing internal telephone services to companies, organizations, or the like.

REFERENCE SIGNS LIST

1 Information processing system
10 Information processing unit (first information processing unit)
20 Second information processing unit
11, 12, 21, 22, . . . Information processing device
110, 210 Administrator function section
111 Connection control section
112 Relay function section
120, 220 Stateful proxy function section
130, 230 DNS function section
140, 240 Location server function section
110a First administrator function section
110b Second administrator function section
120a First stateful proxy function section
120b Second stateful proxy function section
130a First DNS function section
130b Second DNS function section
NW1 User-side communication network (first user-side communication network)
NW2 Second user-side communication network
NW10 In-unit communication network (first in-unit communication network)
NW20 Second in-unit communication network
NW30 External telephone network
UA1, UA2, . . . User terminal
1000 Information processing system
1001, 1002 Information processing unit
1011 Control section

The invention claimed is:

1. An information processing system comprising an information processing unit that performs communication processing among a plurality of user terminals connected via an IP (Internet Protocol) network, the information processing unit comprising:

a service providing section that provides a preset service to a plurality of user terminals; and a control section that acquires an operating state of the service providing section, and generates a new service providing section according to the acquired operating state, wherein the service providing section includes a connection control section that controls the connection among the plurality of user terminals, and the control section acquires an operating state of the connection control section, and generates a new connection control section according to the acquired operating state, wherein the connection control section comprises: a stateful proxy function section; and a DNS (Domain Name System) function section that stores identification information for specifying a communication destination and an IP address allocated to the identification information, in association with each other, the control section receives a connection request notification including the identification information from a communication source user terminal that is a user terminal as a communication source, and outputs the identification information included in the received connection request notification to the stateful proxy function section, the stateful proxy function section outputs the identification information that is output from the control section to the DNS function section, the DNS function section outputs an IP address stored in association with the identification information that is output from the stateful proxy function section to the stateful proxy function section, and the stateful proxy function section transmits a communication destination IP address that is the IP address output from the DNS function section to the communication source user terminal.

2. The information processing system according to claim 1, wherein the control section acquires stateful proxy load information that indicates a load of the stateful proxy function section as the operating state of the connection control section, and, when the load indicated by the acquired stateful proxy load information is larger than a preset threshold load, the control section newly generates the stateful proxy function section.

3. The information processing system according to claim 1, wherein the control section detects occurrence of a fault in the stateful proxy function section as the operating state of the connection control section, and, when occurrence of the fault is detected, the control section newly generates the stateful proxy function section.

4. The information processing system according to claim 1, wherein the control section acquires DNS load information that indicates a load of the DNS function section as the operating state of the connection control section, and, when the load indicated by the acquired DNS load information is larger than a preset threshold load, the control section newly generates the DNS function section.

5. The information processing system according to claim 1, wherein the information processing unit comprises a unit specifying section that stores identification information for identifying a user terminal and unit specific information for specifying the information processing unit to which the user terminal is connected, in association with each other, when an IP address allocated to the identification information included in the connection request notification is not output from the DNS function section, the stateful proxy function section outputs the identification information to the unit specifying section, the unit specifying section outputs the unit specific information stored in association with the identification information output from the stateful proxy function section to the stateful proxy function section, the stateful proxy function section transmits a connection request including the identification information included in the connection request notification to a control section that is provided in another information processing unit specified by the unit specific information output from the unit specifying section, when receiving the connection request from the information processing unit, the control section provided in the another information processing unit outputs the identification information included in the connection request to the stateful proxy function section provided in the other information processing unit, and the stateful proxy function section provided in the another information processing unit transmits a communication destination IP address that is an IP address output from the DNS function section provided in the another information processing unit to the communication source user terminal.

6. The information processing system according to claim 1, wherein the control section determines whether or not a communication destination user terminal is connected to an external telephone network, when the communication destination user terminal is determined as being connected to the external telephone network, the stateful proxy function section transmits a connection request that includes a telephone number as the identification information included in the connection request notification to the external telephone network, and the stateful proxy function section establishes a session between the communication destination IP address and a communication source IP address that is an IP address of the communication source user terminal, and transmits the communication destination IP address to the communication source user terminal, by cooperating with the external telephone network.

7. The information processing system according to claim 1, wherein when receiving the connection request notification that includes a telephone number as the identification information allocated to the communication destination user terminal from the external telephone network to which the communication source user terminal is connected, the control section outputs the telephone number to the stateful proxy function section, and the stateful proxy function section establishes a session between the communication destination IP address output from the DNS function section and a communication source IP address that is an IP address of the communication source user terminal, and transmits the communication destination IP address to the communication source user terminal by cooperating with the external telephone network.

8. The information processing system according to claim 1, wherein the service providing section includes a relay function section that relays a communication among the plurality of user terminals, and the control section acquires an operating state of the relay function section, and generates a new relay function section according to the acquired operating state.

9. An information processing method applied to an information processing system that comprises an information processing unit performing communication processing among a plurality of user terminals connected via an IP (Internet Protocol) network, the information processing unit comprising a service providing section that provides a preset service to a plurality of user terminals, and a control section that acquires an operating state of the service providing section, and generates a new service providing section according to the acquired operating state, wherein the information processing method comprising:

acquiring an operating state of the service providing section, and generating a new service providing section according to the acquired operating state, wherein the service providing section includes a connection control section that controls the connection among the plurality of user terminals, and the control section acquires an operating state of the connection control section, and generates a new connection control section according to the acquired operating state, wherein the connection control section comprises: a stateful proxy function section; and a DNS (Domain Name System) function section that stores identification information for specifying a communication destination and an IP address allocated to the identification information, in association with each other, the control section receives a connection request notification including the identification information from a communication source user terminal that is a user terminal as a communication source, and outputs the identification information included in the received connection request notification to the stateful proxy function section, the stateful proxy function section outputs the identification information that is output from the control section to the DNS function section, the DNS function section outputs an IP address stored in association with the identification information that is output from the stateful proxy function section to the stateful proxy function section, and the stateful proxy function section transmits a communication destination IP address that is the IP address output from the DNS function section to the communication source user terminal.

10. A non-transitory computer-readable storage medium storing a program for controlling an information processing system that comprises an information processing unit performing communication processing among a plurality of user terminals connected via an IP (Internet Protocol) network, the program causing the information processing unit to implement:

service providing section that provides a preset service to a plurality of user terminals; and control section that acquires an operating state of the service providing section, and generates a new service providing section according to the acquired operating state, wherein the service providing section includes a connection control section that controls the connection among the plurality of user terminals, and the control section acquires an operating state of the connection control section, and generates a new connection control section according to the acquired operating state, wherein the connection control section comprises: a stateful proxy function section; and a DNS (Domain Name System) function section that stores identification information for specifying a communication destination and an IP address allocated to the identification information, in association with each other, the control section receives a connection request notification including the identification information from a communication source user terminal that is a user terminal as a communication source, and outputs the identification information included in the received connection request notification to the stateful proxy function section, the stateful proxy function section outputs the identification information that is output from the control section to the DNS function section, the DNS function section outputs an IP address stored in association with the identification information that is output from the stateful proxy function section to the stateful proxy function section, and the stateful proxy function section transmits a communication destination IP address that is the IP address output from the DNS function section to the communication source user terminal.

11. An information processing device that performs communication processing among a plurality of user terminals connected via an IP (Internet Protocol) network, comprising:

a service providing section that provides a preset service to the plurality of user terminals; and a control section that acquires an operating state of the service providing section, and generates a new service providing section according to the acquired operating state, wherein the service providing section includes a connection control section that controls the connection among the plurality of user terminals, and the control section acquires an operating state of the connection control section, and generates a new connection control section according to the acquired operating state, wherein the connection control section comprises: a stateful proxy function section; and a DNS (Domain Name System) function section that stores identification information for specifying a communication destination and an IP address allocated to the identification information, in association with each other, the control section receives a connection request notification including the identification information from a communication source user terminal that is a user terminal as a communication source, and outputs the identification information included in the received connection request notification to the stateful proxy function section, the stateful proxy function section outputs the identification information that is output from the control section to the DNS function section, the DNS function section outputs an IP address stored in association with the identification information that is output from the stateful proxy function section to the stateful proxy function section, and the stateful proxy function section transmits a communication destination IP address that is the IP address output from the DNS function section to the communication source user terminal.

\* \* \* \* \*